Dec. 22, 1959 E. J. LEONARD ET AL 2,918,533

REGISTER-TRANSLATOR CROSSBAR TELEPHONE SYSTEM

Filed Dec. 19, 1956 19 Sheets-Sheet 1

HUNDREDS STAGE

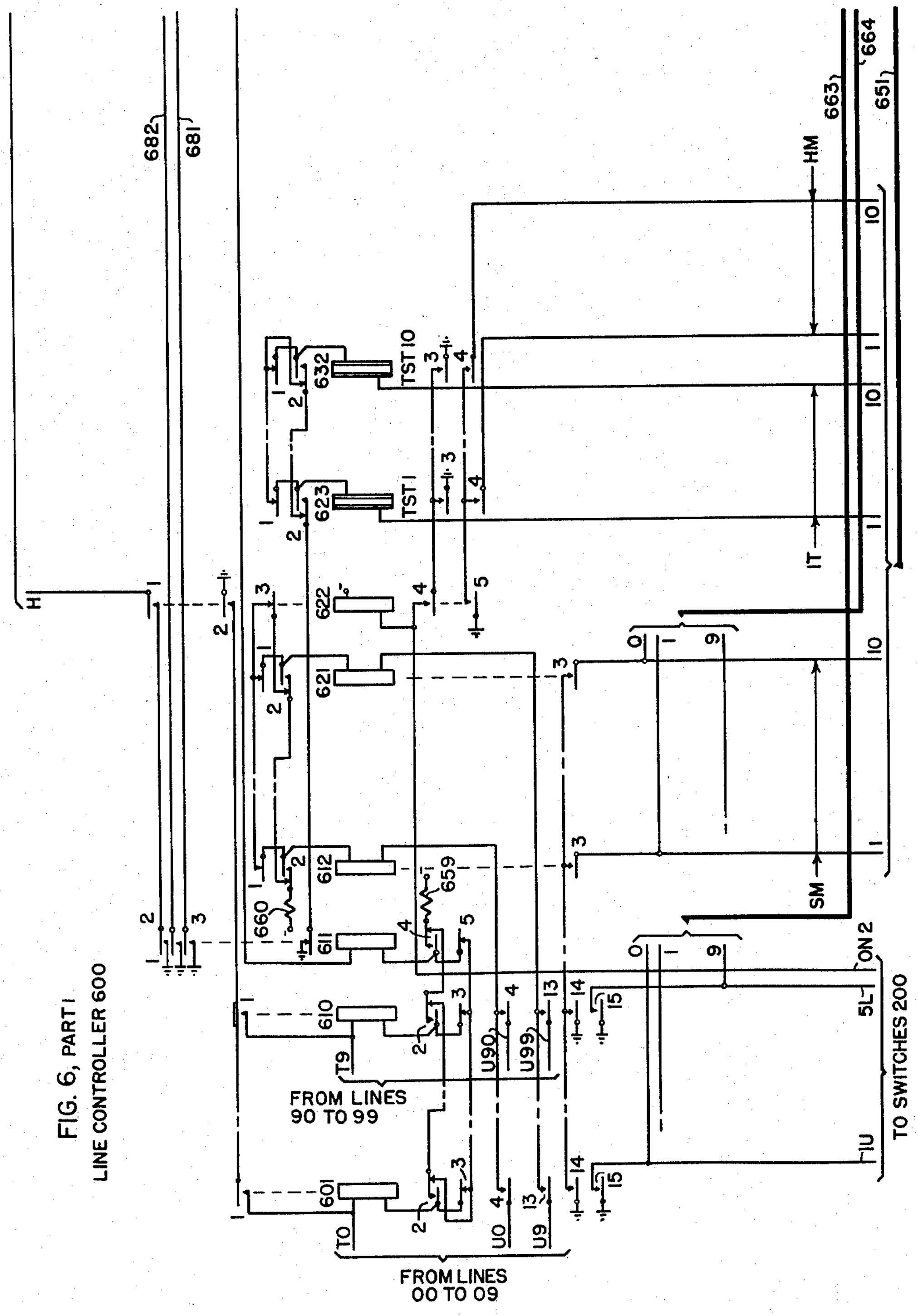
FIG. 6, PART I LINE CONTROLLER 600

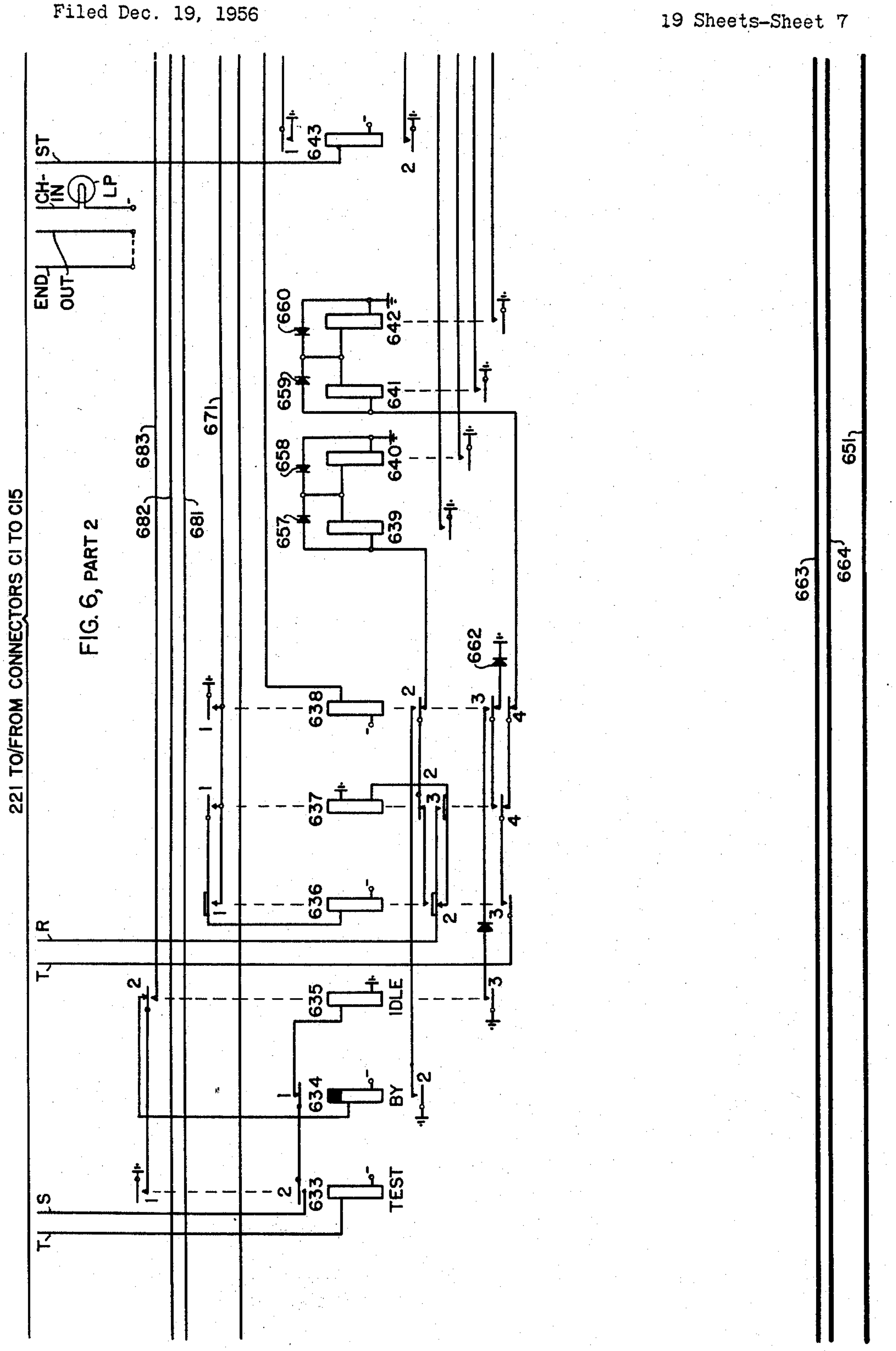
FIG. 6, PART 2

Dec. 22, 1959 E. J. LEONARD ET AL 2,918,533
REGISTER-TRANSLATOR CROSSBAR TELEPHONE SYSTEM
Filed Dec. 19, 1956 19 Sheets-Sheet 8
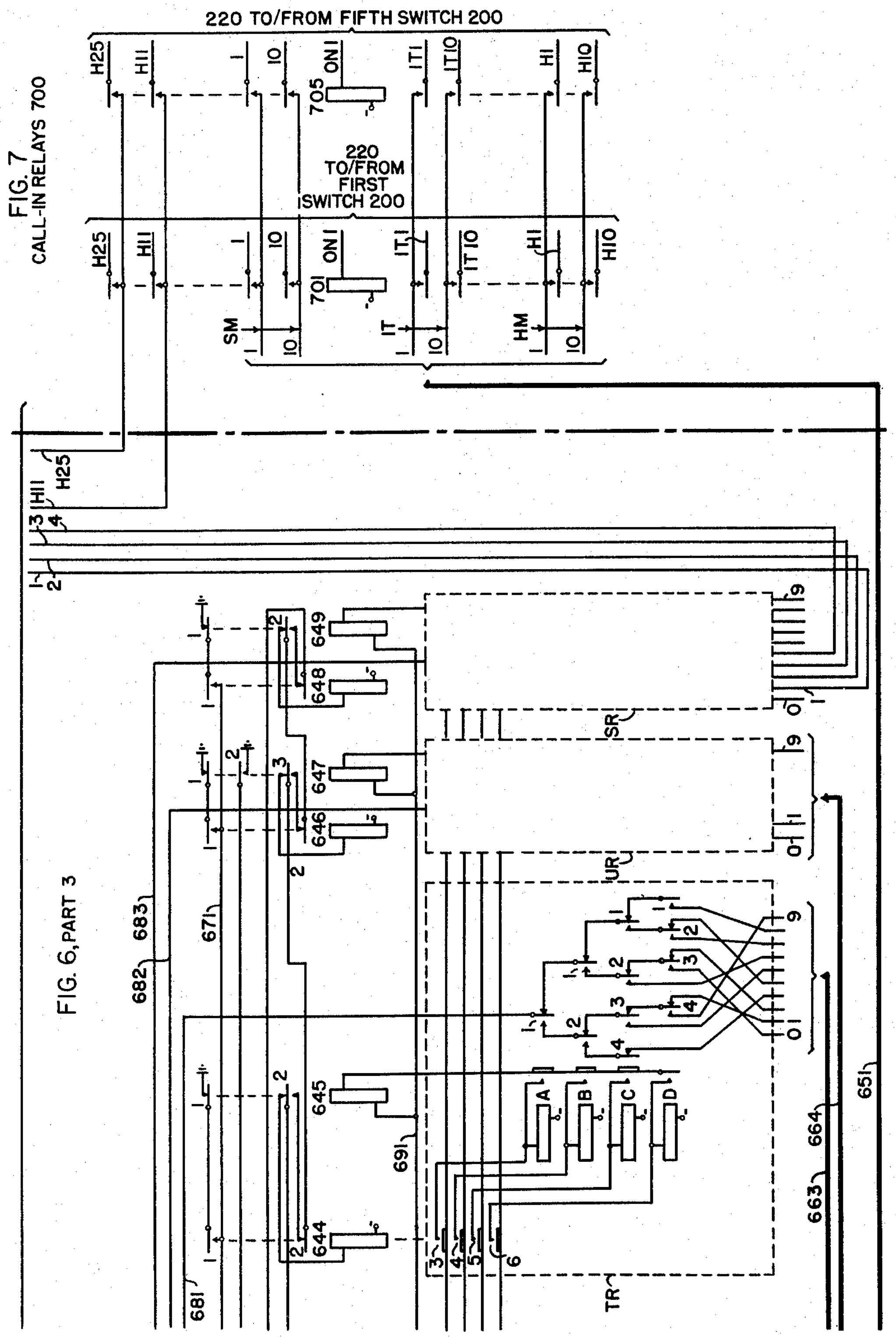
FIG. 7, FIG. 6, PART 3

REGISTER-TRANSLATOR CROSSBAR TELEPHONE SYSTEM
Filed Dec. 19, 1956 19 Sheets-Sheet 9
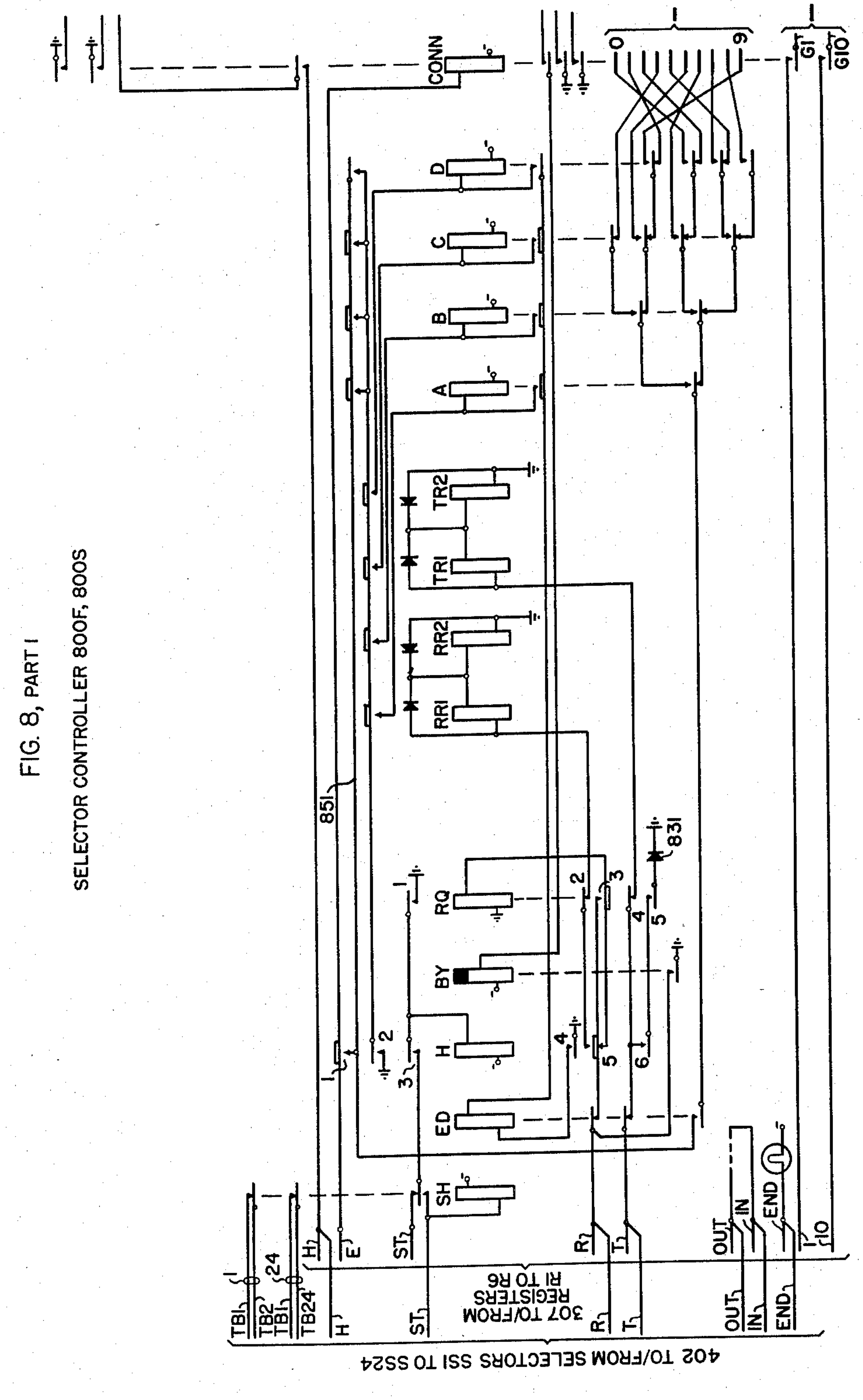
FIG. 8, PART I
SELECTOR CONTROLLER 800F, 800S

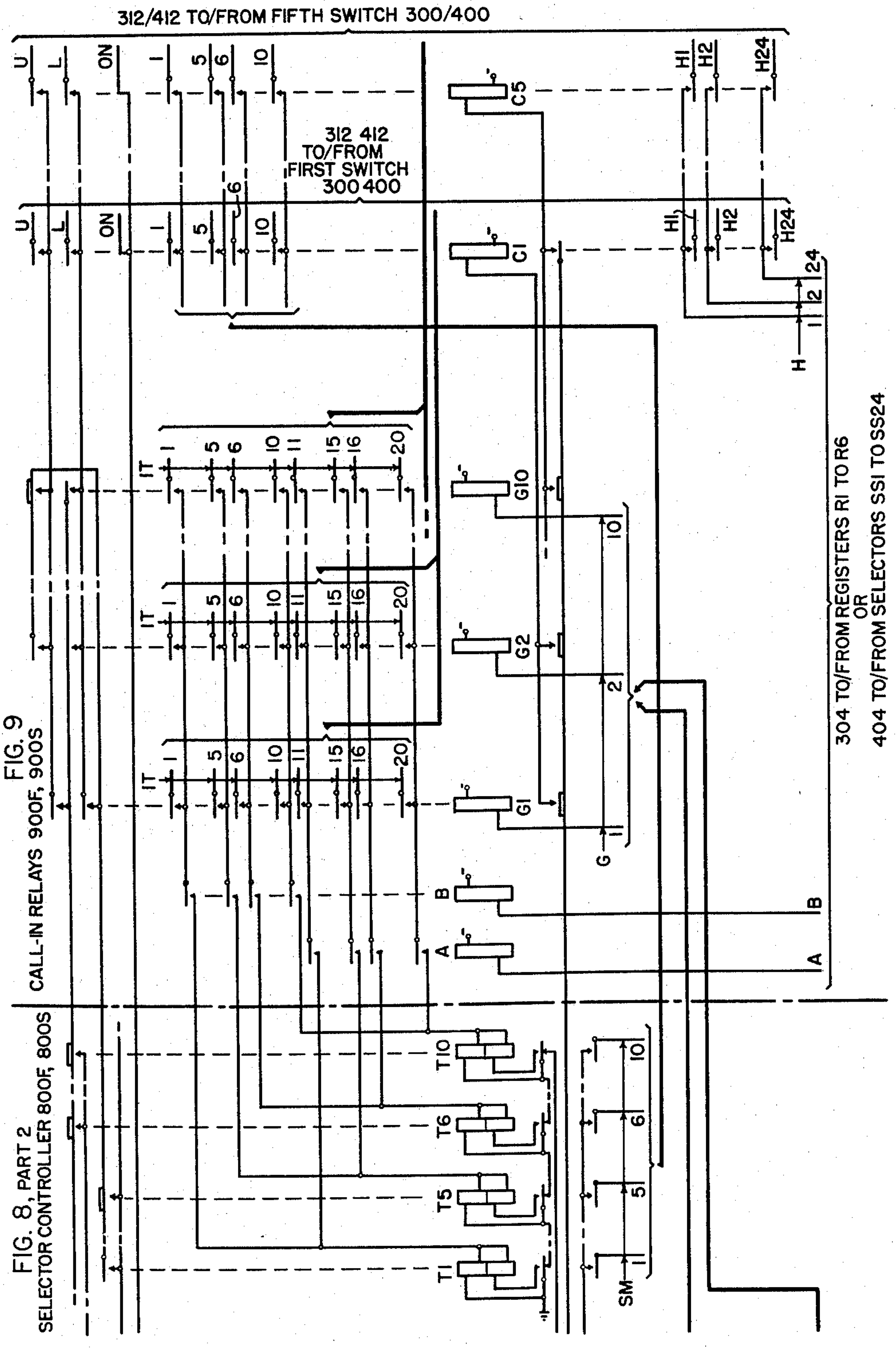
FIG. 9, FIG. 8, PART 2

REGISTER ALLOTTER 1000

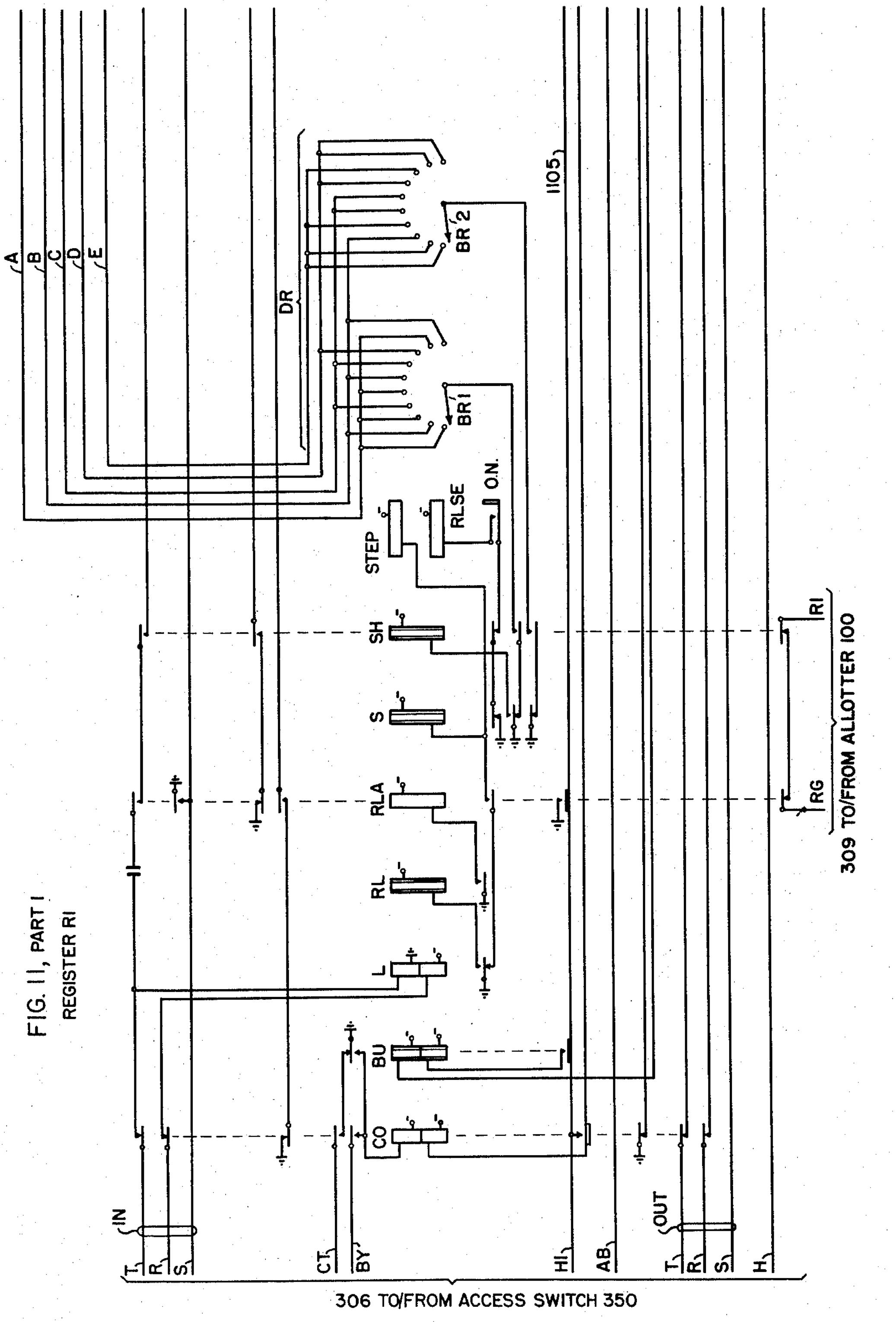
FIG. 11, PART I
REGISTER R1

Dec. 22, 1959 E. J. LEONARD ET AL 2,918,533
REGISTER-TRANSLATOR CROSSBAR TELEPHONE SYSTEM
Filed Dec. 19, 1956 19 Sheets-Sheet 13
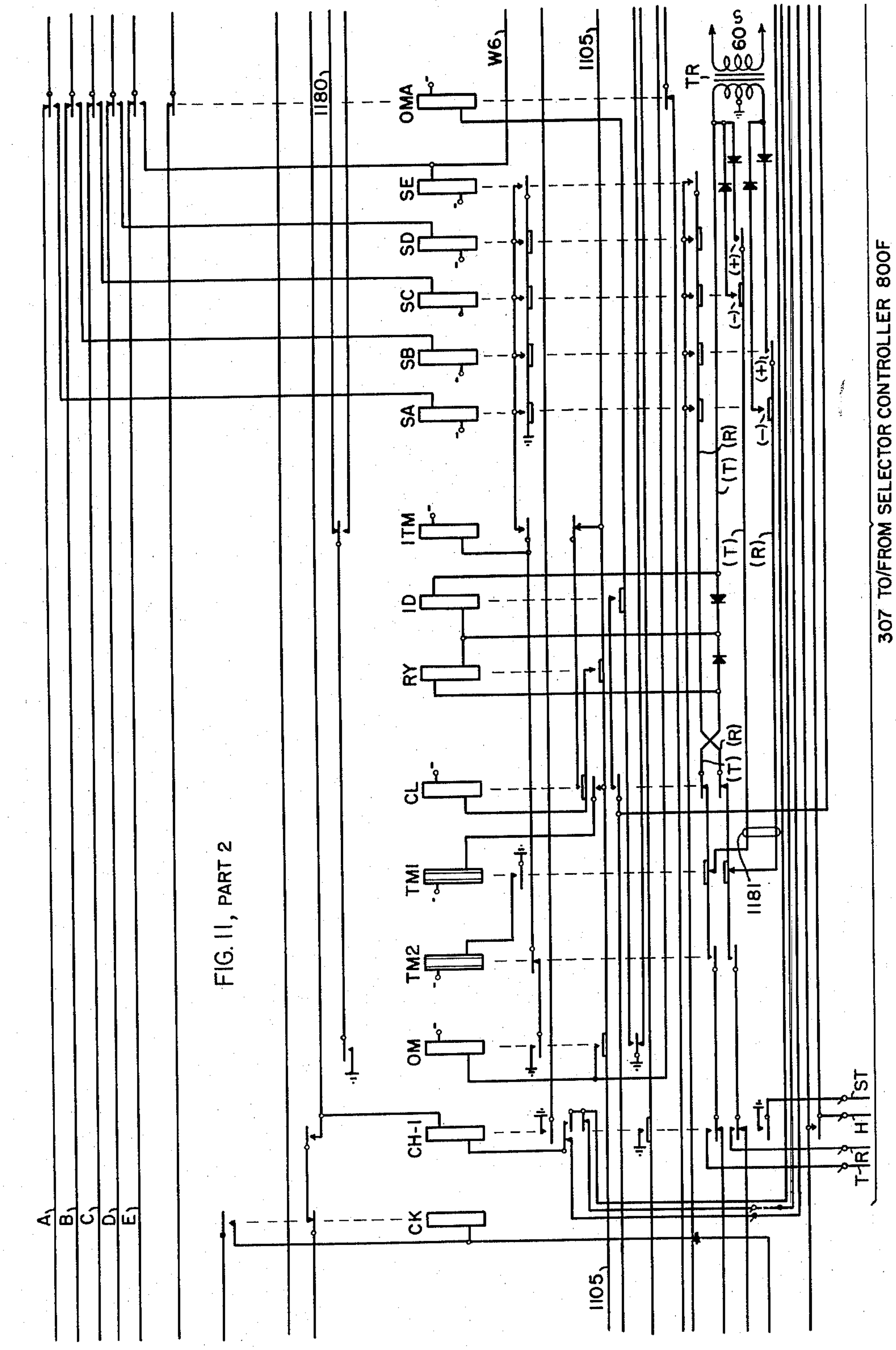
FIG. 11, PART 2

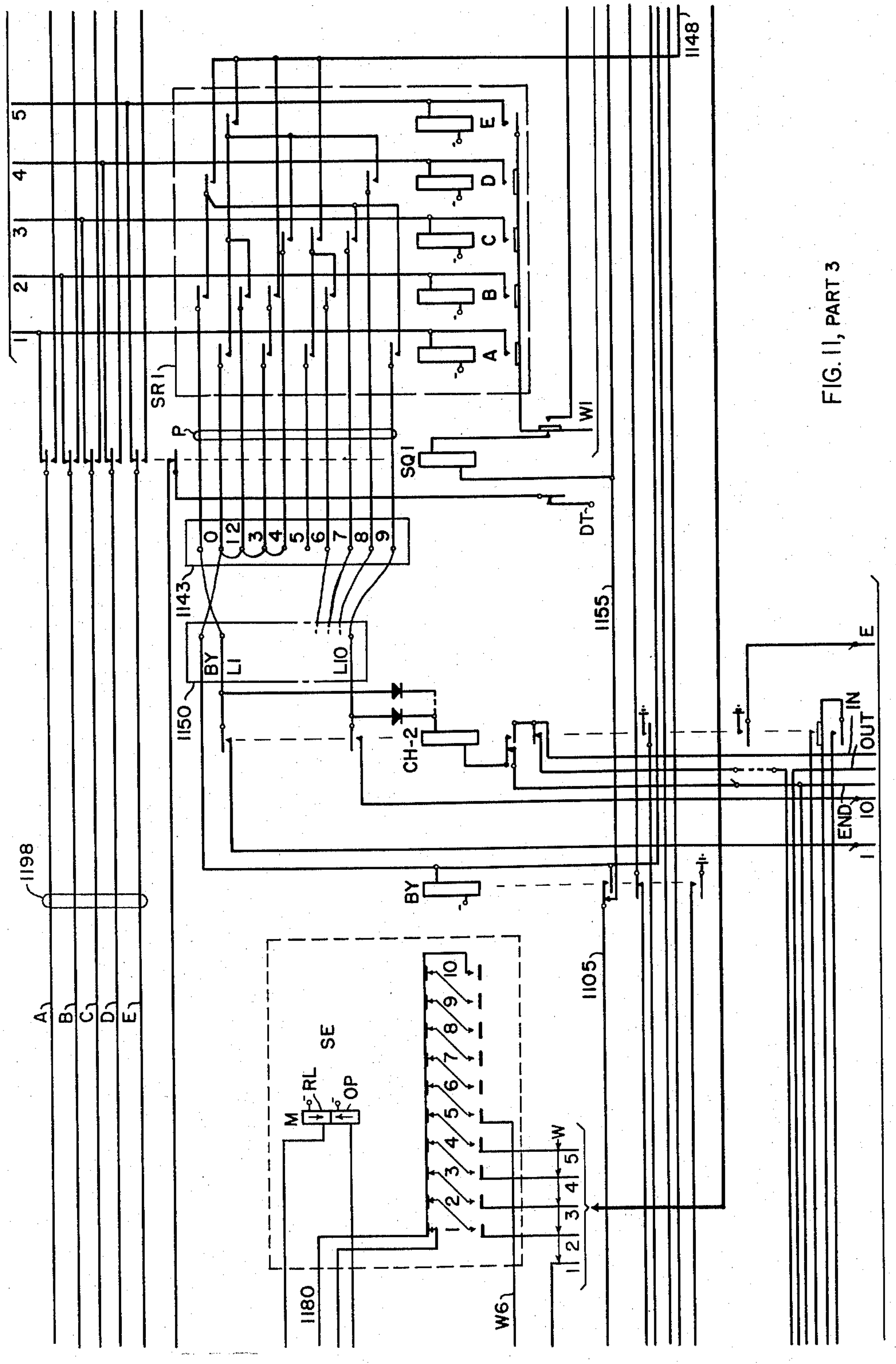
FIG. 11, PART 3

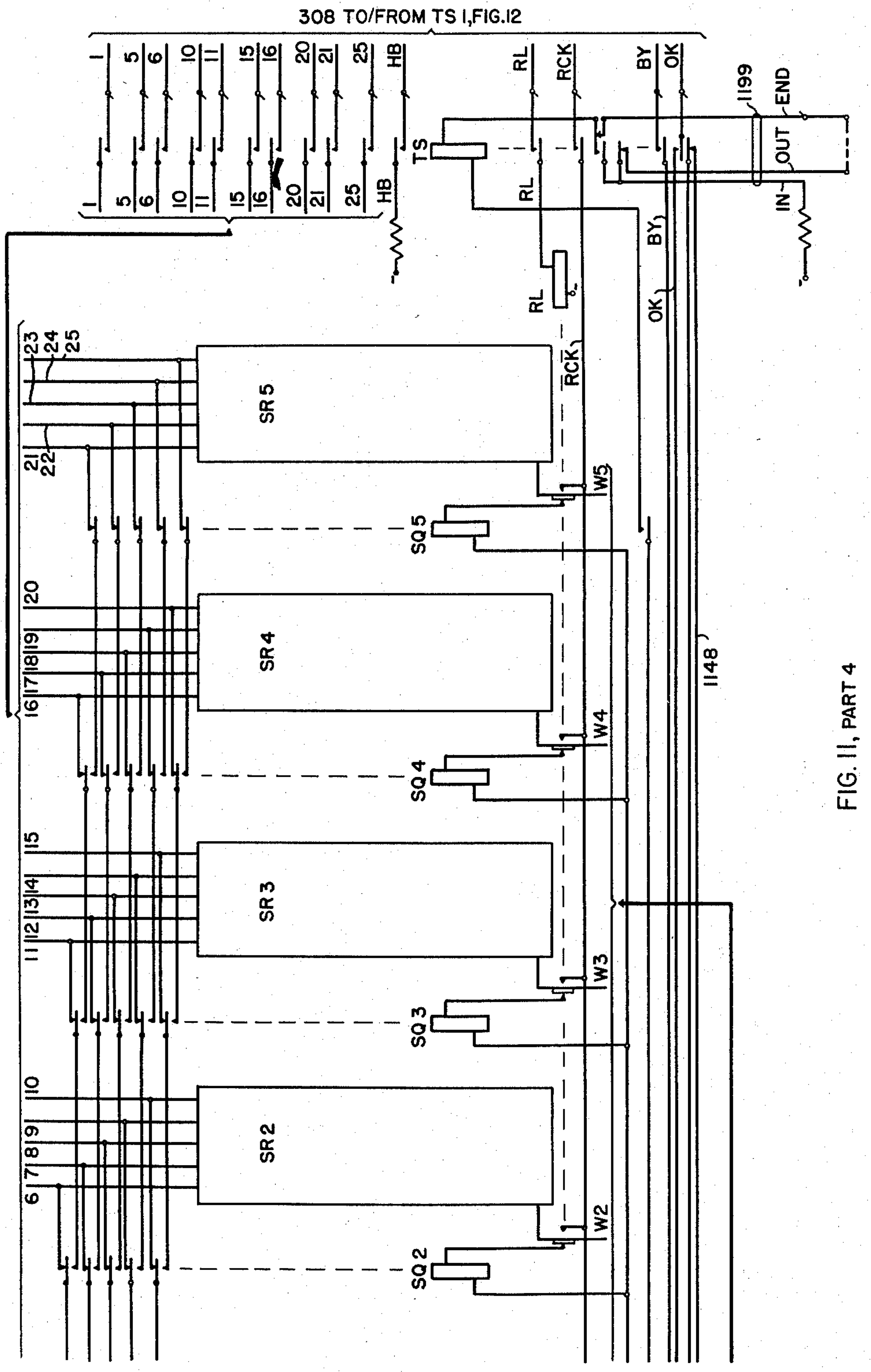
FIG. 11, PART 4

REGISTER-TRANSLATOR CROSSBAR TELEPHONE SYSTEM

Filed Dec. 19, 1956

19 Sheets-Sheet 16

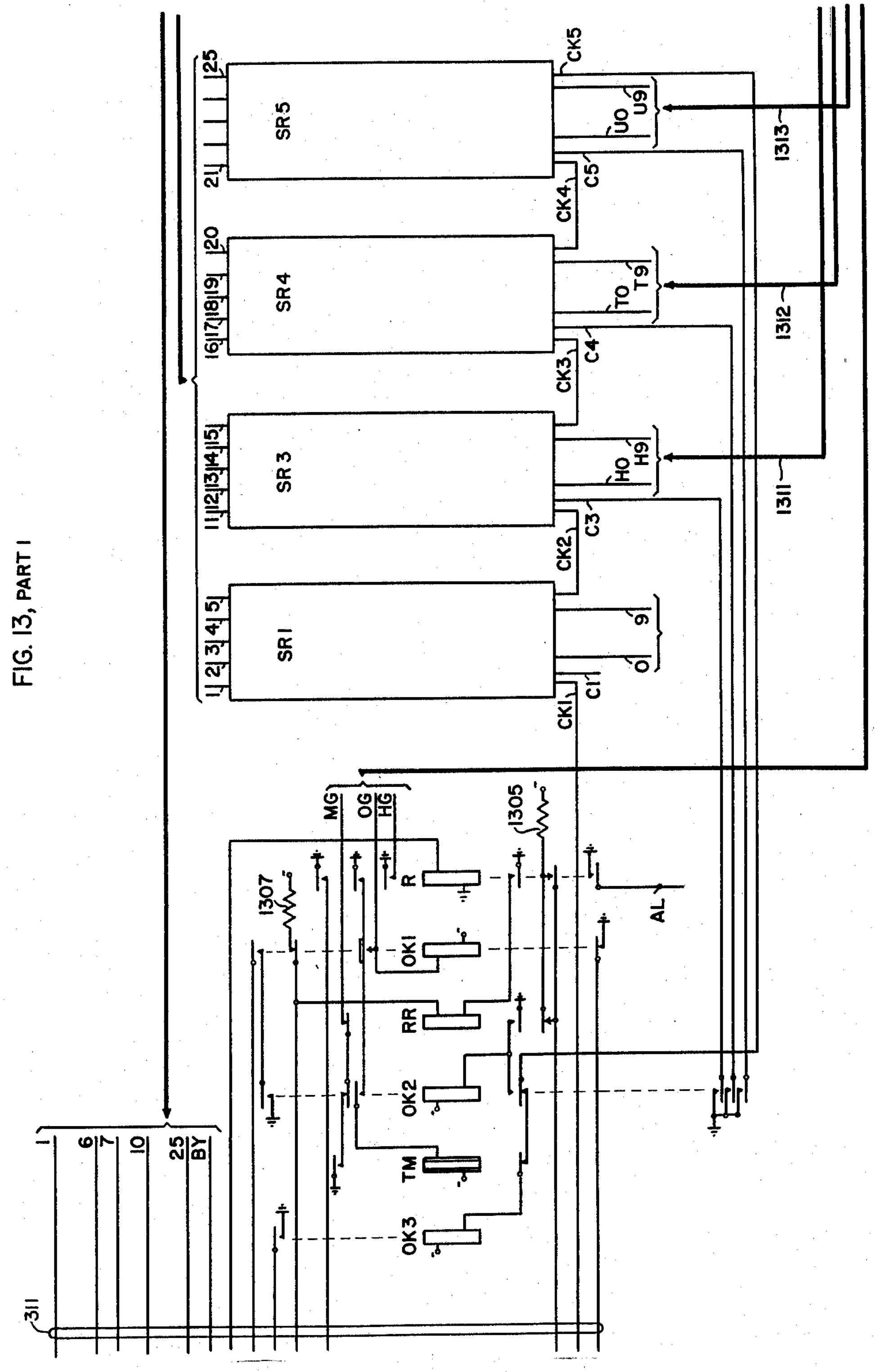
FIG. 13, PART I

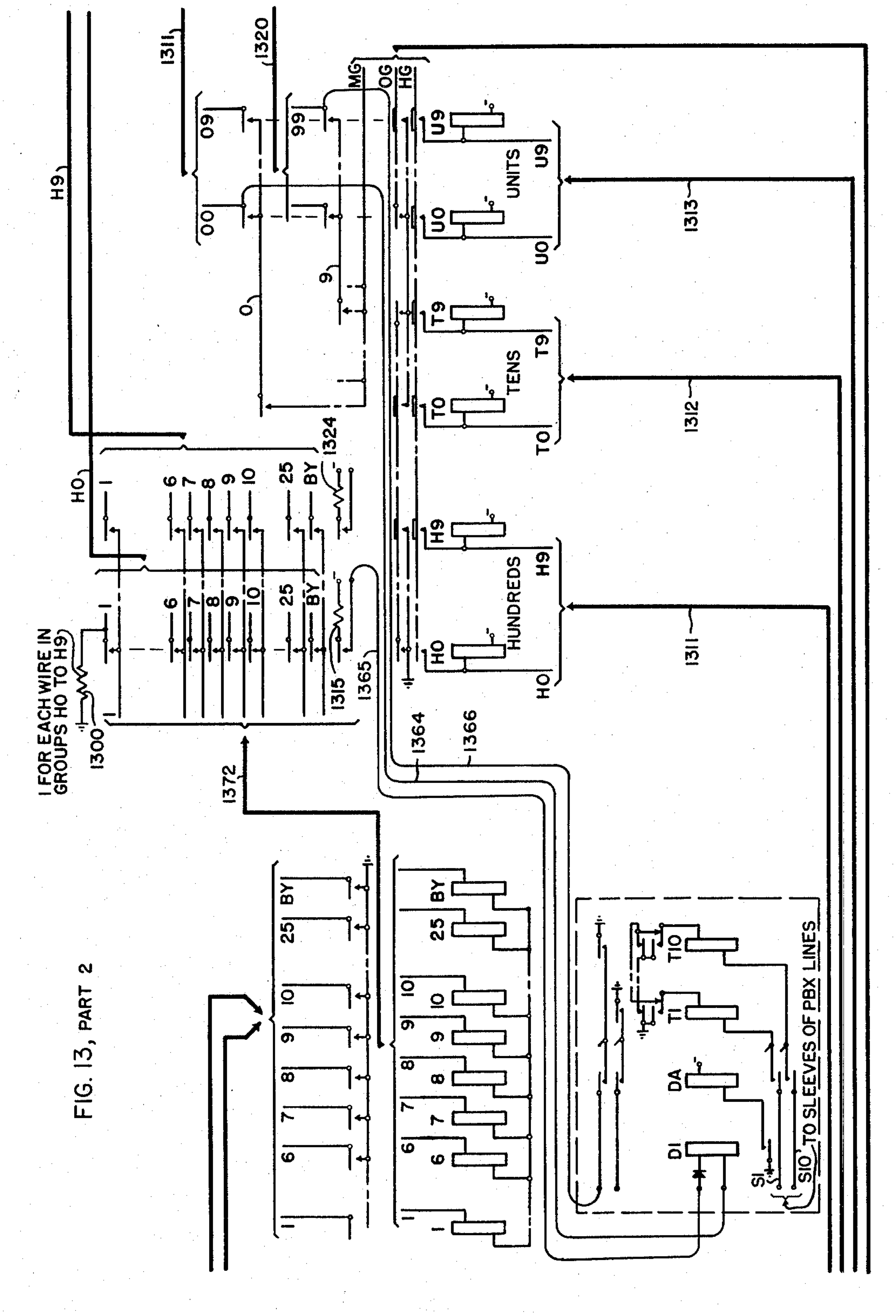
FIG. 13, PART 2

Dec. 22, 1959 E. J. LEONARD ET AL 2,918,533
REGISTER-TRANSLATOR CROSSBAR TELEPHONE SYSTEM
Filed Dec. 19, 1956 19 Sheets-Sheet 19
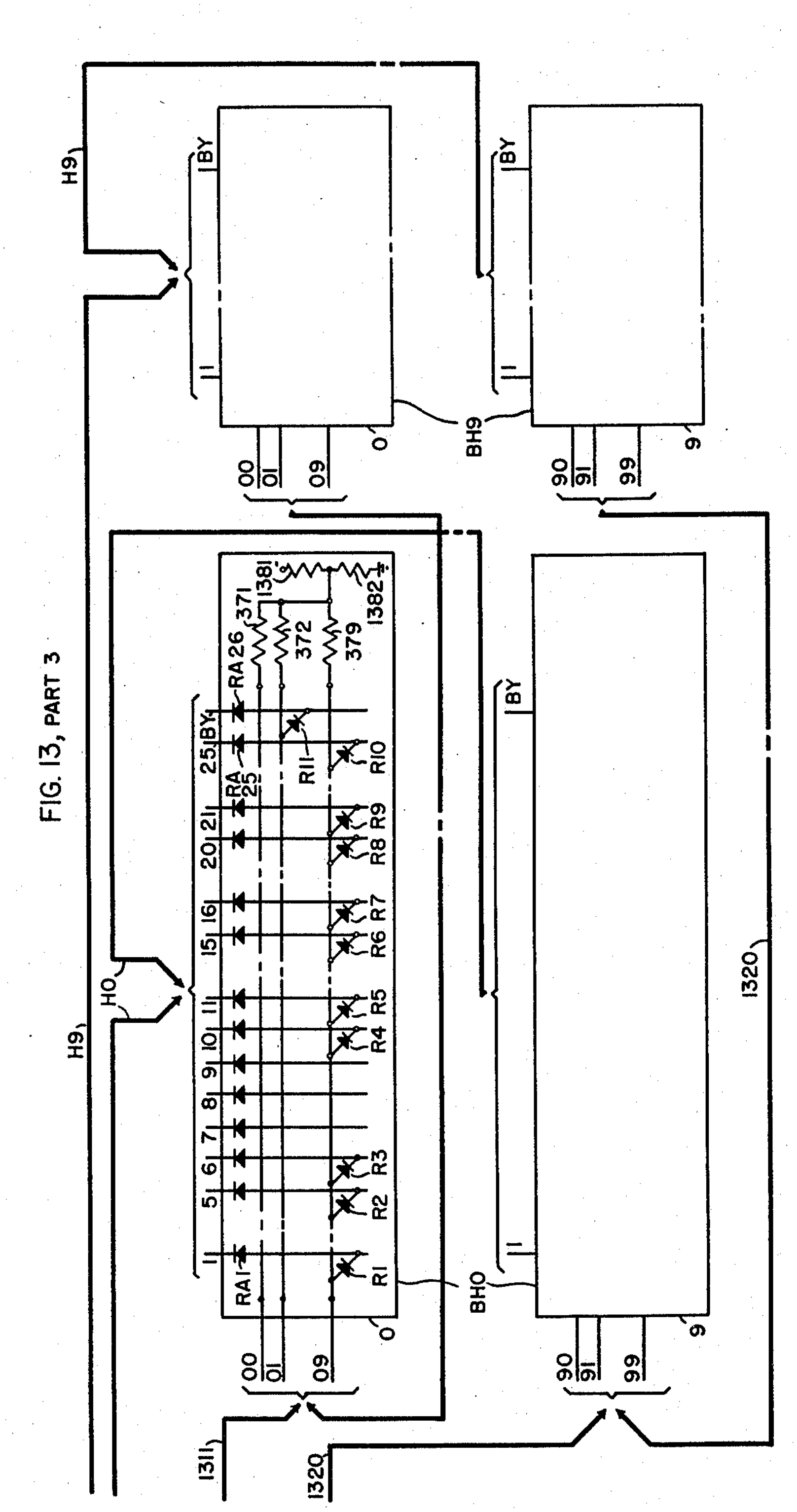
FIG. 13, PART 3

United States Patent Office
2,918,533
Patented Dec. 22, 1959

2,918,533

REGISTER-TRANSLATOR CROSSBAR TELEPHONE SYSTEM

Edward J. Leonard, Chicago, Albert Hemel, Skokie, Kenneth A. Karow, Chicago, John C. Gibson, Oak Lawn, and Keith L. Liston, Elmhurst, Ill., and Harry Tarschisch, Zurich, Switzerland, assignors to International Telephone and Telegraph Corporation, New York, N.Y., a corporation of Maryland Application December 19, 1956, Serial No. 629,282

15 Claims. (Cl. 179—18)

This invention relates to a register-translator crossbar telephone system, and its principal object is to provide a telephone switching system of the indicated type which is efficient and economical in its use of switching apparatus at the several switching stages as well as in its use of auxiliary control relays and other apparatus, while employing an efficient and economical register-translator arrangement.

This application is a continuation in part of our prior application Serial No. 564,605, now abandoned, for a Register-Translator Crossbar Telephone System, filed in the United States Patent Office January 20, 1956, by E. J. Leonard et al.

In automatic telephone systems using crossbar switches to complete connections between calling and called lines, it is customary to follow the usual practice of providing one or more offices having a maximum office capacity of 10,000 lines or numbers, and to provide switching stages in any such office comprising a non-numerical or line-finder stage, followed by numerical stages comprising one or more stages of office selectors, followed in turn by two or more switching stages through which the subscriber lines of the office are reached. According to one common practice, the subscriber-access numerical stages comprise thousands and hundreds selector stages and a connector stage.

At any numerical switching stage, it is customary to provide the crossbar switching apparatus in the form of one or more frames of equipment, and to provide control apparatus common to all the paths through a single crossbar switch, or through a group of crossbar switches on the frame. Such common controlling apparatus is called in temporarily when a switching path is to be completed through any associated crossbar switching apparatus, thus supplementing the relays and/or control apparatus individual to the respective talking paths or trunks incoming to the stage. A recording or registering operation must occur for any numerical stage to direct the extension of the connection therethrough, by the closing operation of a crossbar switch. This registering operation is controlled directly or indirectly by the called (or dialed) digits of telephone numbers. In certain known systems, each trunk incoming to a numerical switching stage includes individual apparatus for recording the digit or digits required at that stage for the directing operations, while in other known systems a common pool of registers is provided in association with the trunks at the first numerical switching stage to record all of the digit information relating to the call, following which the information is passed to an interstage marker arrangement which forms a portion of the common apparatus for the several switching stages, or is sent forward over the extended connection for such recording as may be desired at the subsequent switching stages as they are successively encountered during the progress of the connection toward the called line.

The foregoing known systems have, for the most part, been open to the objection that the interstage common marker arrangements are very complicated and cumbersome, where used, or that the forward sending of stored digit information to successive stages has been slow because of the limitations of the registers heretofore used at such succeeding stages and the registers themselves have been a matter of considerable expense.

According to the invention, the foregoing and related drawbacks of prior crossbar telephone switching systems have been largely overcome by providing a new control arrangement for the stages of crossbar switches which includes a pool of number registers accessible from the trunks leading to the first numerical switching stage, in cooperation with a low-cost translation arrangement based on the use of small-capacity translators numerically accessible to the number registers in common and pertaining respectively to separate blocks of called numbers. In the illustrated embodiment, a 10,000 number office uses ten 1,000-number translators.

Further, according to the invention, the translator pertaining to the number block in which the called number is located is seized from the number register in use, whereupon the registered number is transferred to the translator and is canceled in the number register. The translator thereupon effects the registration of a translated number in the number register by resetting and reusing the digit-registering apparatus upon which the originally called number was formerly registered. Thereafter, the number register proceeds to send digit information forward to the individual stages on a stage-by-stage basis as the connection progresses toward the called line.

A feature of the invention is that an out-marking relay group cooperates with the digit registers of the number register in succession to transmit any registered digit forward by a fast two-pulse marking system which employs alternating current over the talking conductors of the connection and includes a selective rectifier arrangement. A "digit" so transmitted may have any one of fifteen values when four-relay registers are employed as receivers of the transmitted information. A special feature of this arrangement is that the receiving registers at any numerical switching stage are located in the common control apparatus of the stage, thereby representing a considerable saving as compared to an arrangement requiring individual digit registers at the respective trunk paths.

According to a further feature, a high speed of call completion is secured by the timely forwarding of the successive directing digits while guarding against the premature sending of digit information. A sequence control arrangement is used in the number register for transmitting the digit information to a succeeding stage upon the receipt of revertive information over the connection that the switching operation at the crossbar switching stage last controlled has been completed.

Further features of translator economy is concerned with the use of a specialized rectifier matrix, with rectifier diodes which are physically movable to desired crosspoint locations to determine the translated digit combination to be impressed responsive to the receipt of called number information through the register-controlled relay-tree contacts, and with a dual-marking arrangement which operates the relays which record the translated information according to a code which permits a great reduction in the required number of such relays.

Advantage is taken of the essential economy of the stated subdivided translator arrangement to arrange for individual translation for each subscriber telephone number, which has heretofore been excessively expensive when a group of 10,000-number translators has been required to serve the traffic needs. The assigned numbers may thus be completely divorced from dependence upon relative switchboard locations of the line terminals. This feature is utilized to permit so-called P.B.X, or common number, groups to be made up of arbitrarily grouped lines selected irrespective of their respective terminations on the switchboard; it permits calls to special numbers to be handled through a smaller number of switching stages than the other calls, it permits intercept service for disconnected lines and stations to be handled through a common and efficient group of intercept trunks; and, it permits party-line service (sometimes called multi-station service) to be furnished on a completely flexible basis which permits retention of the same telephone number when a party-line subscriber moves to a new location, even though only a single called terminal is provided for a party line, which represents a considerable economy in connector-terminal crossbar switching apparatus.

The above-mentioned and other features and objects of this invention and the manner of attaining them will become more apparent, and the invention itself will be best understood, by reference to the following description of an embodiment of the invention taken in conjunction with the accompanying drawings comprising Figs. 1 to 13, wherein:

Fig. 1 is a single-line call-through trunking diagram;

Figs. 2 to 5 comprise a call-through circuit diagram of the apparatus of Fig. 1, showing respectively the line stage, the first-selector stage, the second-selector stage, and the connector-relay apparatus;

Fig. 6 shows the line controller of Figs. 1 and 2;

Fig. 7 shows the call-in relays 700 of Figs. 1 and 2;

Fig. 8 shows the first-selector controller 800F of Figs. 1 and 3 and its modification to serve as the second-selector controller 800S of Figs. 1 and 4;

Fig. 9 shows the call-in relays 900F or 900S of Fig. 1, further shown respectively in Figs. 3 and 4;

Fig. 11 shows a register such as R1 to R6 of Fig. 1, of which R1 is indicated in Fig. 3;

Fig. 13 shows a translator such as T0 to T9 of Fig. 1, of which T0 is indicated in Fig. 3.

Figure 1:
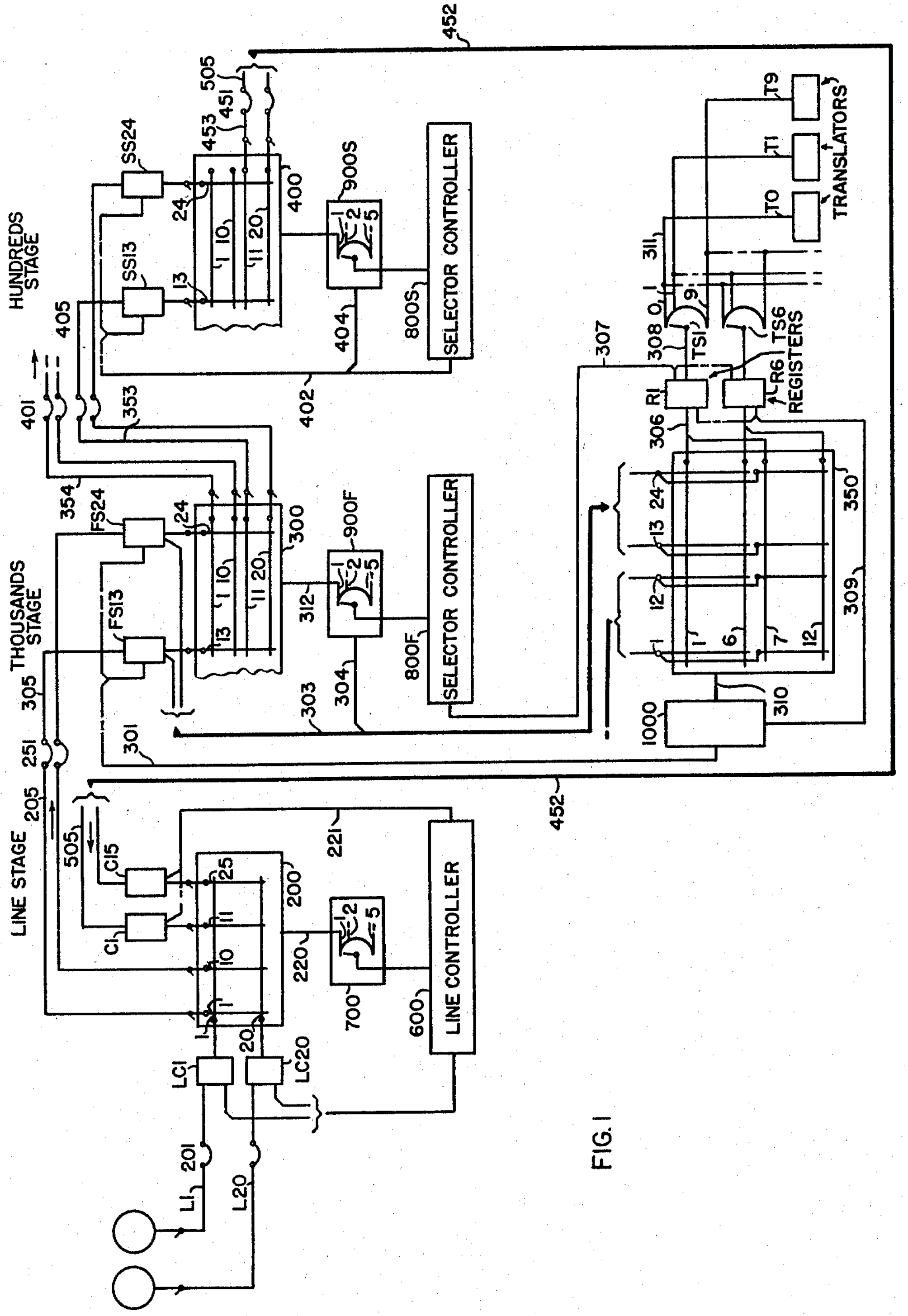

*Figure 1*

The embodiment chosen for a simple illustration of the invention will now be described, referring first to Figure 1.

The lines such as L1 to L20 are arranged in switching groups of 100 lines each. Any such switching group is served by five line-stage, finder-connector crossbar switches, of which the illustrated crossbar switch 200 serves the first twenty lines of the group. Each such switch (and the same is true for the switches 300 and 400) may be substantially as disclosed in the United States Patent No. 2,577,067, R. P. Arthur. It is provided with ten principal select magnets for selecting double crosspoint sets in the horizontal direction, and has two additional select magnets, termed upper and lower, for selecting either the upper portion or the lower portion of the crosspoint sets selected by any one of the ten principal select magnets.

Each of the five crossbar switches 200 serving a group of 100 lines is a combined finder and connector switch arranged generally according to the pending application of E. J. Leonard, 100-Line Direct-Access Crossbar Telephone Switching Unit, Serial No. 414,845 filed in the United States Patent Office March 8, 1954. The first ten of the 25 verticals of this switch provide finder action, with ten originating paths for any group of twenty lines of the hundred, with suitable grading among the five switches of the group to provide an adequate number of finder paths, such as the one over trunk 205, 305.

The final fifteen verticals 11 to 25 of the switch 200 are available for connector action, and are assigned respectively to the illustrated connectors C1 to C15 each of which comprises trunk relay apparatus. Because of the translating arrangement disclosed herein, which permits completely flexible party line service to be provided with only a single called terminal per line, the line intermediate distributing frame LIDF illustrated in the Leonard application above cited is not required, wherefore the line multiple is continuous across all of the twenty-five verticals of each switch 200.

Each of the lines L1 and L20 is indicated as a multi-station line, but it will be understood that multi-station lines and single-station lines can be provided in any proportion that may be desired.

The finder trunks of the illustrated 100-line group extend through jumpers on distributing frame 251 to first selectors such as FS13 to FS24.

The switching operations of the five switches 200 are controlled by line controller 600, a separate one of which is provided for each 100-line group. For line-finding action, the line controller is controlled from line circuits such as LC1 to LC20. For connector action controller 600 is seized and controlled from the connectors C1 to C15. Controller 600 obtains access to the respective switches 200 through call-in relays 700.

The thousands and hundreds selector stages are indicated respectively by the crossbar switches 300 and 400, each of which is a 24-vertical two-section switch with a separate horizontal multiple for each section. Only the right hand section of each switch is shown, being the section having verticals 13 to 24. Each section of such a switch gives 12 incoming selector trunks access to two ten-trunk numerical groups, or levels. The verticals of five such switches are employed in multiple to provide selectors such as FS13 to FS24 with access to ten 10-trunk levels. This selector arrangement is substantially as shown in the United States patent to Robert W. Hutton, No. 2,768,241.

With the indicated thousands and hundreds ranks of ten-level selectors the capacity of the equipment illustrated in Fig. 1 may be perhaps 5,000 lines, which will require five of the ten levels at the thousand selector stage for thousands selection, leaving the remaining five levels available as for respective trunk groups out-going to other offices of the same network of multi-thousands offices. For example one of the two illustrated 10-trunk levels of switch 300 may be employed as an outgoing level leading to another office of the network, while the other illustrated level of switch 300 may comprise a local level leading to one of the local 1000-line groups. The trunks from switches 300 are carried through distributing frame 401 to their respective desired destinations.

The five switches 300 which serve the same group of twenty-four incoming first-selector trunks are controlled by selector controller 800F, which obtains access to the required switch 300 through call-in relays 900F. Controller 800F is controlled from any one of the associated registers R1 to R6.

The hundred stage for one of the local 1,000-line groups includes fixe switches 400 which serve twenty-four incoming trunks and gives them access to ten levels of trunks, two for each switch.

Switches 400 are controlled by selector controller 800S through call-in relays 900S, the numerical control over the controller 800S being exercised from any one of the twenty-four selectors, including SS13 to SS24, associated with switches 400.

At the thousands-selector stage, up to six registers R1 to R6 are provided in a pool common to the twenty-four first selectors including FS13 to FS24. These selectors are represented respectively by verticals 1 to 24 of register-access crossbar switch 350, which is a 24-vertical, 12-horizontal switch having its vertical multiple conductors separated between horizontals 6 and 7 to permit six pairs of horizontals (1, 7; 2, 8 etc.) to serve respective registers, since two crosspoint sets must be closed to secure the required number of conductors in a connection to a register from a selector.

Access switch 350 is controlled by register allotter 1,000 from any calling selector, according to the busy or idle condition of the registers. Any seized register is arranged to cause controller 800F to set one of the switches 300 immediately according to the office designation if the office designated is other than the local office, or to defer the setting of the switches 300 until the entire number has been called if the local office is designated.

When the local office requires a full 10,000 block of four-digit call numbers, the previously noted subdivided translator arrangement comprises ten translators T0 to T9, which correspond respectively to thousands digits 0 to 9. Access from registers R1 to R6 to the translators is controlled through respective translator switches TS1 to TS6, which (after the complete number is received and stored in the register) are positioned according to the stored thousands digit. These translators are common to other groups of registers, serving other groups of selectors. Seizure of a designated translator occurs subject to its being idle. Following seizure of any translator, the hundreds, tens, and units digit information stored in the register is passed to the translator and stored therein, following which translated information is sent back to, and stored in, the register giving the switchboard location of the line serving the called station and the station location of the called station on that line, in the form of thousands, hundreds, tens, units, and stations digit information. The translator is thereupon freed for further use. The register then transmits this information, causing thousands and hundreds selection to occur at switches such as 300 and 400, under the control of controllers such as 800F and 800S. The tens, units, and stations information is transmitted over the established connection, through a connector such as C1 to C15, to a line controller such as 600 which thereupon sets a line-stage switch such as 200 to connect with the called line, if idle, and to transmit ringing current from the connector to the called line according to the station called.

*Figures 2 to 5*

Referring now to Figs. 2 to 5, the progress of connections through the equipment shown thereon will be described.

Figure 2:
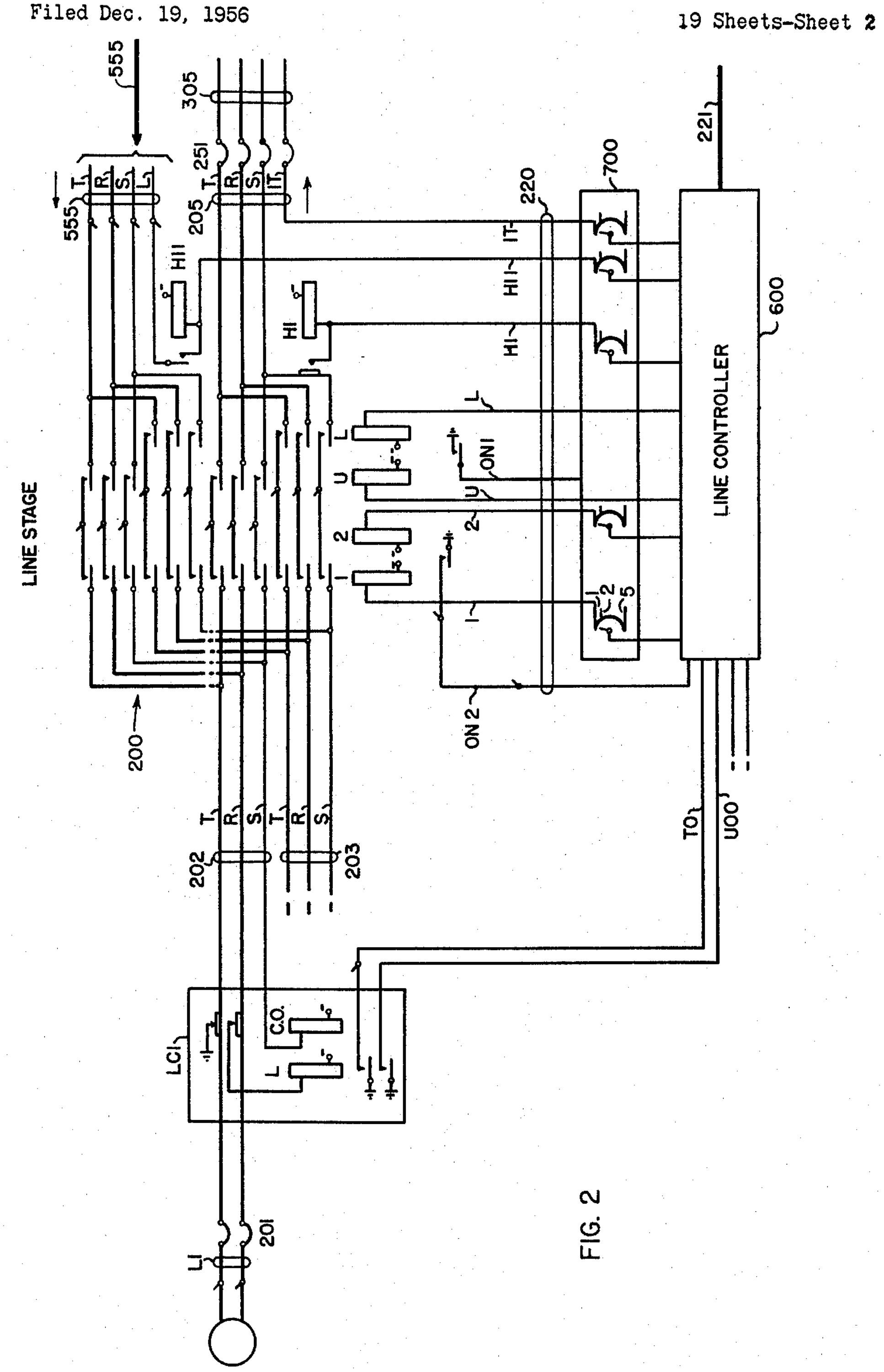

When a calling subscriber on line L1 of Figs. 1 and 2 originates a call by looping the conductors of the line in the usual manner, line relay L of line circuit LC1 operates through contacts of relay C0, and grounds the associated tens and units conductors T0 and U00. Line controller 600 thereupon responds as hereinafter described to identify the calling line and to find an idle associated finder trunk such as 205, 305, whose idle test conductor IT is normally supplied with battery potential through resistor 301 in first selector FS13, over test-battery conductors TB1, TB2, and TB3, and contacts of cut-through relay CT. This test battery potential is supplied to the testing apparatus of controller 600 through contacts of call-in relays 700. The hold magnet H1 of switch 200 is thereby selected.

Incidental to the identification of the calling line L1, select magnet 1 and U of 200 are selected and operated. Wires ON1 and ON2 are grounded as pilot signals. Hold magnet H1 is operated, whereby multiple 202 of the calling line is extended through the upper group of contacts of the 6-wire set controlled jointly by magnets 1 and H1, by way of contacts controlled jointly by magnets U and H1, to trunk 205, 305.

The ground potential applied to hold magnet H1 to cause its operation is extended through contacts of magnet H1 to the sleeve conductor S of the seized trunk, operating cutoff relay C0 of LC1, restoring line relay L. Controller 600, however, remains seized so long as current flow continues over IT of trunk 205, 305.

Ground on S of 305 closes a circuit path through contacts of relay CT of FS13, and through contacts of hold magnet H13 of switch 350, to one terminal of chain relay CH of FS13. If the chain comprising conductors IN, OUT, and END of group 302 is idle, the chain is complete at dotted portions 313 (which indicates the passage of the chain through preceding and succeeding selectors of the group). Then, relay CH of FS13 operates from battery potential supplied to the chain from 1000.

Upon operating, relay CH loops the associated tip and ring conductors: makes a more direct connection between conductor IT of trunk 305 and resistor 301; locks itself to IN; opens the succeeding portion of the chain; and isolates its winding from conductor END.

Relay CH also grounds start wire ST leading to register allotter 1000, which operates as hereinafter described to cause access switch 350 to extend the connection to an idle register, such as the register R1, the idle condition of which is indicated by a conductor in group 309. To effect selection of register R1, controller 1000 grounds conductor H1 in group 310, thereby energizing select magnets 1 and 7 of 350. The conjoint energization of these magnets grounds the associated off-normal conductor ON, signalling that selection has been effected in both halves of the switch. Controller 1000 thereupon grounds conductor H in group 302, closing a circuit, through contacts of the operated relay CH, and over conductor H13 in group 303 for hold magnet H13 of 350. The illustrated sets of crosspoint contacts of the switch 350 are thereupon closed to extend a connection to register R1 over conductors 306. Conductors T and R of the calling line (temporarily looped locally at contacts of H of FS13) are now extended to R1, causing a line-relay operation (hereinafter described) to occur therein, returning holding ground over IN conductor S of group 306 to the sleeve conductor S of the connection, and over H1 of 306.

Hold magnet H13 also opens a point in the idle test circuit of trunk 205, 305 and it disconnects slow-restoring relay CH which restores after a slight interval, removing battery potential from conductor IT of trunk 205, 305, whereupon line controller 600 and call-in relays 700 clear out.

The seized register R1 now supplies a dial-tone signal to the established connection whereupon the calling subscriber is expected to dial the digits in the desired number.

As hereinafter described, operations in the register R1 depend upon the value of the first digit dialled. If the first digit indicates an outgoing call, such as to another office of the network, the register R1 causes one of the switches 300 to be set by 800F and 900F during the inter-digit interval to extend the connection to an idle trunk in the called outgoing group, control being exercised over conductors in groups 304 and 307. R1 also operates cut-through relay CT of FS13, which extends the conductors T, R, and S of 305 to the switches 300, and locks itself to conductor S. The usual pulse repeater (not shown) on the seized outgoing trunk (such as 354 of Fig. 1) grounds conductor S to hold the connection.

R1 now clears out, and H13 of 350 restores. The succeeding digits of the called number pass through the noted pulse repeater to the called office.

If the first digit received indexes the local office, the register R1 prepares to receive and store the final four digits of the called number. When the final digit is stored in R1, translator switch TS1 is positioned according to the value of the stored thousands digit to seize an idle translator, such as the "0" translator T0, if idle or as soon as it becomes idle. When the translator is seized, the hundreds, tens, and units digits stored in R1 are transmitted simultaneously over conductors in groups 308, and 311 to translator T0, which stores and translates the called number. If the call is to an equipped station, the translated number comprises a 5-digit combination; thousands, hundreds, tens, units, and stations digits.

The translator first causes the storage devices of register R1 to be cleared of the number originally dialed, and then sends back the five digits of the translated number simultaneously over conductors in groups 311 and 308 to reset these storage devices. When this has occurred, translator switch TS1 and translator T0 clear out, following which register R1 controls the setting of the switches in succession according to the translated number stored therein.

One of the switches 300 at the thousands stage is set according to the translated digit, by control exercised over conductors in groups 304 and 307 and through 800F and 900F. For this purpose, R1 grounds AB in group 306. With hold magnet H13 of 350 operated, the ground on AB is extended to wire B of group 304 to inform 900F that the call is from a B-group selector (second half of switches 300) rather than from an A-group selector.

Figure 4:
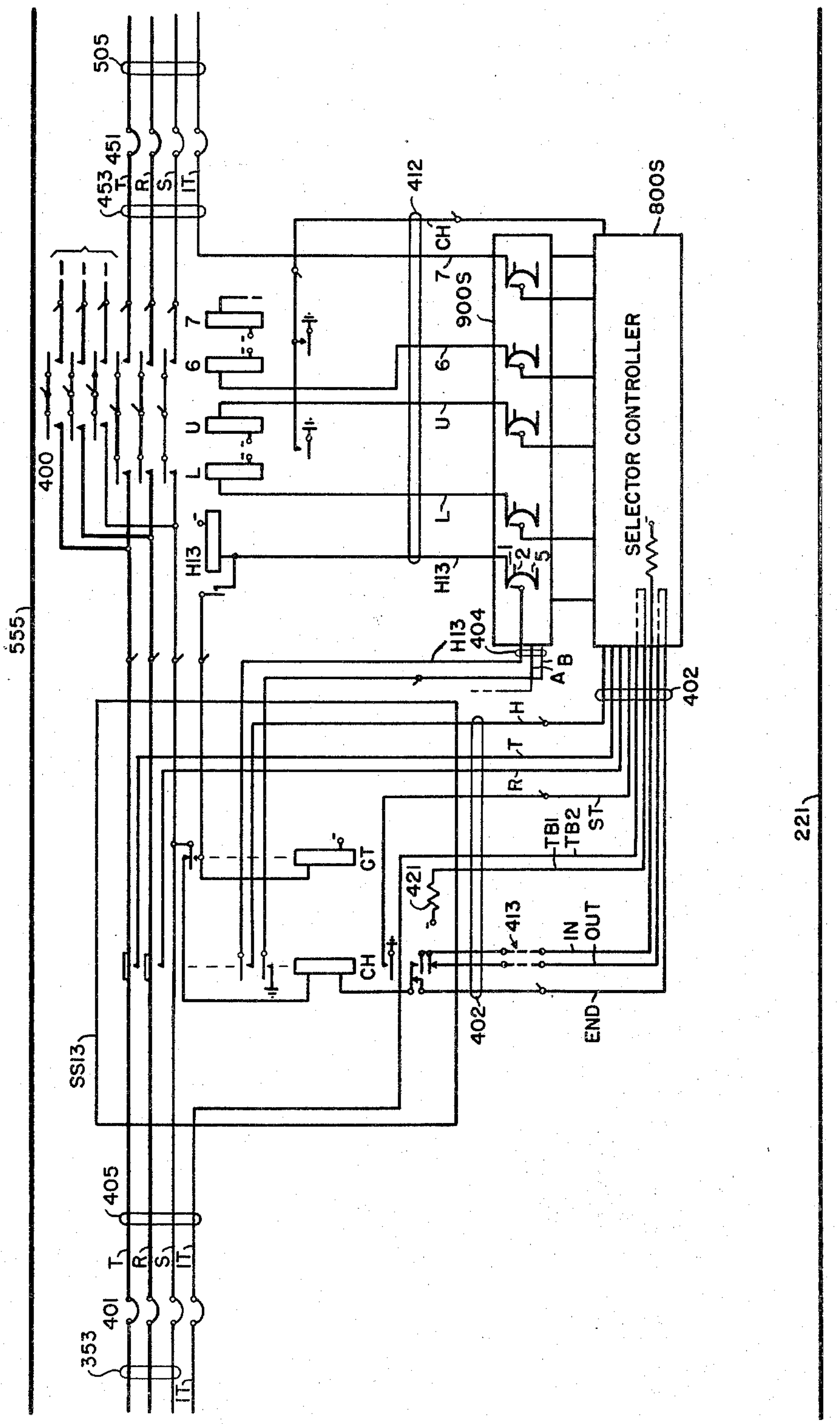

If the call is to the 1000-line group served by the hundreds-stage apparatus of Fig. 4, the trunk group selected includes trunk 353, 405. If that trunk is idle, battery potential applied to its conductor IT through resistor 421, conductors TB1, TB2 and contacts of relay CT. To select this trunk, the selector controller grounds wires L and 6 in group 312, energizing select magnets L and 6 of the illustrated first switch 300. Conductor ON in group 312 is thereupon grounded as a signal to the selector controller 800F that an idle trunk in the called group has been selected. Register R1 is thereby caused to ground conductor H in group 306, closing a circuit through contacts of 350, conductor H of 304, contacts of 900F, and over conductor H13 of 312 for hold magnet H13 of switch 300. Trunk extension 329 is thereby extended to trunk 353, 405. Hold magnet H13 locks to the associated conductor S which is now grounded by R1, following which selector controller 800F and call-in relays 900F clear out and the energized select magnets L and 6 of switch 300 restore.

Ground on conductor S of trunk 405 now extended through closed contacts of switch 300 to conductor S of trunk 353, 405 to one terminal of chain relay CH of second selector SS13. If selector controller 800S is idle, operating potential is supplied to relay CH serially over conductors IN, OUT and END in group 402. Relay CH of SS13 locks itself into and breaks the associated chain, grounds start conductor ST in group 402 and conductor B in group 404; joins conductors H of 402 and 404; and extends the talking conductors T and R of trunk 405, over conductors T and R, of 402 to the selector controller 800S.

Register R1, when ready to send the hundreds digits of the translated number, applies a ready signal to conductor R of its OUT group, now extended to selector controller 800S. When ready to receive the hundreds digit and having received the ready signal from the register, controller 800S transmits a ready signal back over conductor T to register R1, which thereupon executes an operation hereinafter described to clear the conductors T and R for the transmission thereover in a 4-element code of signals indicative of the value of the hundreds digit. These signals are thereupon recorded at 800S.

Register R1 assumes a temporary inter-digit position, and again applies a ready signal to R of OUT.

Figure 5:
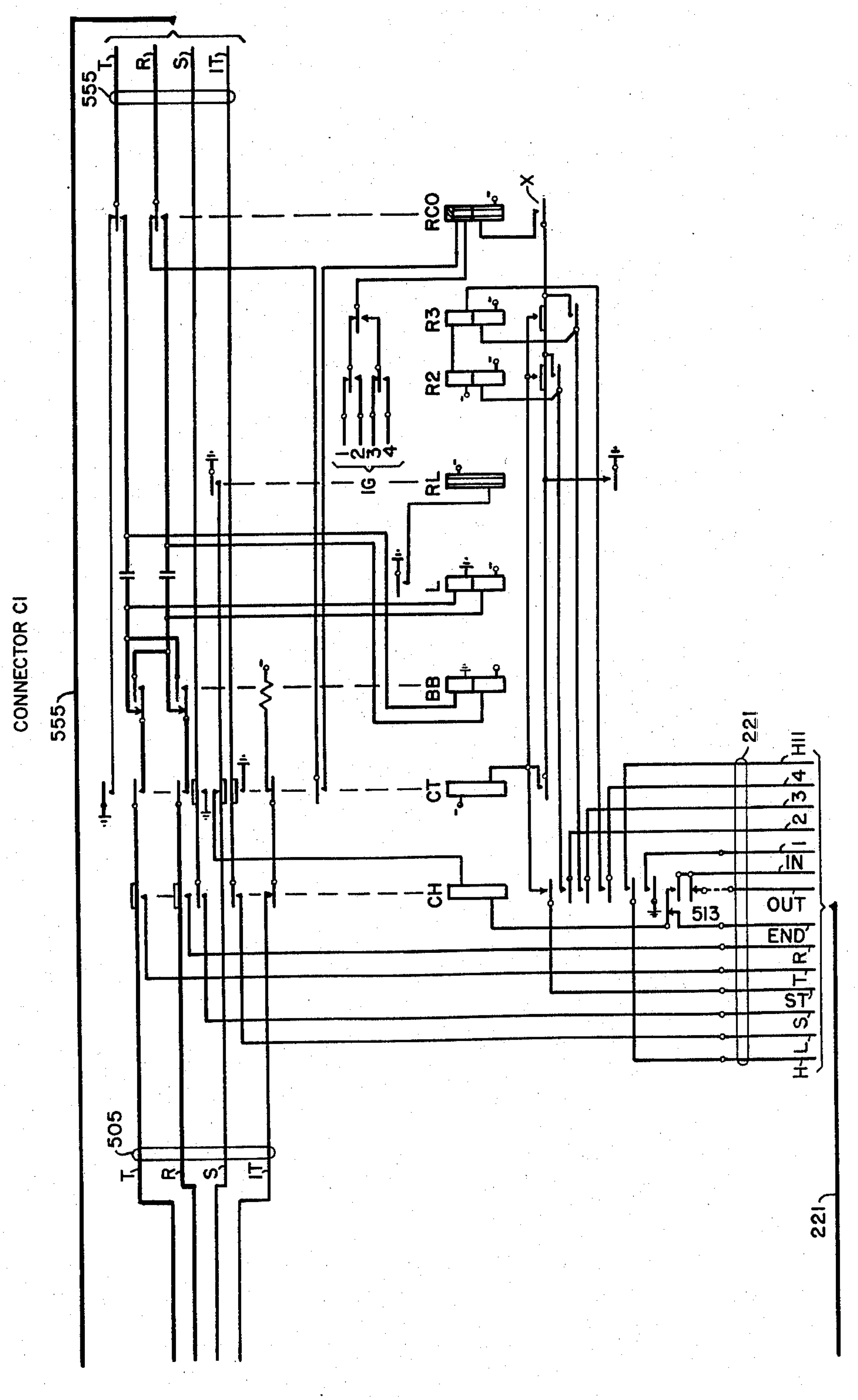

Controller 800S operates through call-in relays 900S as described for 800F and 900F to select an idle trunk leading to a connector in a called hundreds group, such as 453, 505 of connector C1, Fig. 5. When select magnets L and 6 of 400 are operated to select trunk extension 453, ground on conductor ON in group 412 is extended over conductor H in groups 402 and 404 and contacts of 900S to energize hold magnet H13 of switch 400. The selected contacts of switch 400 are thereby closed to extend the connection to connector C1.

Local contacts of H13 extend operating ground to cut-through relay CT, which further opens conductor IT of 305; restores relay CH; and locks itself and magnet H13 of 400 to the grounded conductor S of 405. The restoration of CH renders the chain idle. Items 800S and 900S clear out responsive to the removal of ground from ST of 402 and to the removal of ground from B of 404.

In connector C1 of Fig. 5, ground appearing on sleeve conductor S of the seized trunk 505 extends through contacts of relay CT to one terminal of CH. If the chain represented by conductors IN, OUT and END in group 221 is idle, relay CH operates over these conductors from battery potential supplied to conductor IN by line controller 600 of the called 100-line group; locks itself into and opens the chain; opens conductor IT of 505 to mark the trunk busy; closes points for certain conductors in group 221, including the grounding of conductor ST therein to ready 600 for connector action.

OUT conductors T and R of register R1 are now extended through switches 300 and 400 to the corresponding conductors of trunk 505, and thence through contacts of relays CH of C1, and over conductors T and R in group 221 to line controller 600.

As hereinafter explained, relay apparatus in controller 600, when ready to receive, responds to a register-ready signal over conductor R by transmitting a receiver-ready signal over conductor T to the register R1, whereupon R1 clears the extended tip and ring conductors for digit transmission, followed a moment later by the transmission thereover of the tens digit 4-element code.

The tens digit is received and stored in controller 600, following which the units and stations digits are similarly transmitted in sequence and are received and stored in controller 600.

According to the stored combination of tens and units digits, line controller 600 selects the one of the five associated crossbar switches 200 and operates select magnets therein to select the called one of the twenty lines served thereby. If the line called is the one associated with conductors 203 of Fig. 2, the illustrated switch 200 is the one selected and select magnets 1 and L therein are selected, and are operated over conductors 1 and L in group 220. Conductors ON1 and ON2 in group 220 are now grounded, causing conductor H in group 221 to become grounded, extending ground to conductor H11 in group 221. A circuit is thereupon closed through 600, and contacts 700, over conductor H11 of group 220 for energizing hold magnet H11 of 200. Conductors T, R, and S in group 555 of conductor C1 are now extended through the selected contact sets to conductor group 203 of the called line. At its local contacts, H11 of 200 locks itself to conductor L in group 221, temporarily maintained grounded at 600.

Sleeve conductor S of the called line is now extended, through contacts of the operated relay CH of Fig. 5 to conductor S in group 221, which is now extended to ground through a test relay in controller 600. If the called line is busy, controller 600 places ground directly on conductor R of the T, R pair extended thereto from register R1. R1 thereupon grounds conductor BY in group 306, extending ground over BY of 303 to the lower winding of busy relay BY in FS13. Relay BY thereupon operates and locks itself to its associated conductors T and R of group 305; places holding ground locally on conductor S of group 305; and connects busy-tone conductor BT to conductor T of group 305, thereby returning a busy signal to the calling line. At the same time, the register R1 initiates operations which result in its clearing out after a slight interval, including the release of magnet H13 of 350 by the removal of holding ground from conductor H1 of 306.

On the other hand, if the line represented by conductors 203 is idle when called, the cutoff relay CO thereof operates in series with the noted test relay of 600 to clear the called line for ringing. Line controller 600 now signals the idle-line condition to the register R1 (by making a ground connection to the tip conductor of the signaling pair through a suitably poled rectifier)

whereupon R1 extends ground over conductor CT of 306 and 303 to operate cut-through relay CT of FS13. Incoming conductors T, R, and S in group 305 are thus connected respectively to conductors in group 329, thus extending the calling line metallically to the conductors in trunk 305 of the connector C1. Shortly, register R1 clears out and removes ground from conductor H1 in group 306 to release hold magnet H13 of 350.

The registration and storage of the stations digits in line controller 600 is assumed to have any one of four values, corresponding respectively to stations digits 1 to 4 and to conductors 1 to 4 in group 221. If the station selected on the called line is station 1, ground on 1 of 221 operates cut-through relay CT without affecting either of the ringing-selection relays R2 and R3, leaving ringing conductor 1 of interrupted-generator group IG connected; for station 2 or 3 the corresponding relay R2 or R3 is operated alone to select the corresponding conductor 2 or conductor 3 in group IG; and for station 4, relays R2 and R3 are both operated (over conductor 4 in group 221) selecting conductor 4 in group IG for ringing station 4 on the called line. Either relay R2 or R3, on operating, locks itself to ground at contacts of release relay RL (shortly to operate) and extends operating ground to the winding of cut-through relay CT, which operates and locks to the holding ground shortly to be supplied by relay RL.

Upon operating, cut-through relay CT closes conductors T and R in trunk 505, through contacts of back bridge relay BB, to the windings of line relay L of C1 which now operates over the calling line, operating its associated release relay RL, which supplies holding ground for relay CT (and relays R2, R3 if operated) and places holding ground on S of 505 to maintain the connection after the common apparatus has cleared out. 600 and 700 clear responsive to the release of CH of C1 by CT of C1.

Relay CT of C1 also locally grounds the sleeve conductor S of the called line, by grounding S of 555, and it closes a ringing circuit to the called line from the connected one of the conductors 1 to 4 in interrupted-generator group IG, contacts of relays R2 and R3, line winding of ring-out-off relay RCO, and contacts of that relay to conductor R of the called line, with a return path to ground from conductor T of the called line through contacts of relay RCO and relay CT of C1.

When the call is answered, relay RCO operates in the usual manner; locks itself to ground at RL contacts, and transfers T and R of the called line from the ringing path to back-bridge relay BB, which now operates to make the usual reversal of current flow over the calling T and R conductors.

When the subscribers have unlooped their respective lines at the end of the conversations, relays BB and L of connector C1 restore. A moment later, relay RL of C1 restores clearing out the connection by releasing R2 or R3, if operated, and relay CT. Holding ground is now removed from conductor S in 505 and S and L in 555. Thereby restored are the cutoff relays such as CO of Fig. 2, and the hold magnets such as H1 and H11 of 200, and H13 of 300 and 400.

If, during the described setting up of a connection, either selector controller 800F or 800S finds all trunks busy in the called group, it signals that fact to the calling register R1, which operates busy relay BY of FS13, and clears out, as described for a busy called line.

*Figures 6 and 7*

Referring now to Figs. 6 and 7, line controller 600 and call-in relays 700 through which finder and connector action for the associated 100-line group is controlled, will be described.

For finder action one of the ten tens wires T0 to T9, and one of the 100 units wires U00 to U99, is grounded by a line relay such as L of LC1, Fig. 2.

If, for example, the first (or 00) line L1 is calling, ground on tens wire T0 operates "0" tens-group relay 601 through chained contacts of relays such as 601 to 610, and 611, to battery through 659. Contacts 2 and 3 of 601 lock 601 into the lockout chain and open the chain to relays 610, 611.

Contacts 4 to 13 of 601 connect units wires U00 to U09 to respective units relays 612 to 621. 612 operates from ground on U00 through contacts 4 of 601, to battery through the chain of 612 to 621, and resistor 660.

Contacts 15 of tens-group relay 601 ground wire 1U (wire U of 220, Fig. 2) being its corresponding one of ten tens wires leading to the upper and lower select magnets wires 1U to 5L of the five switches 200.

The first switch 200 thereupon grounds its off-normal wire ON1, operating its call-in relay 701 (Fig. 7) to call-in the 25 hold-magnet wires (including H1 and H11 of 220, Fig. 2), the ten select-magnet wires 1 to 10 of the switch, and its 10 idle-test wires (including IT of 205, Fig. 2). Select-magnet wire 1 of the called-in group is now grounded through contacts 14 and 3 of 601 and 612, and contacts 16 of 701, operating the first principal select magnet of the switch. Wire ON2 is thereby grounded, operating relay 622 to lock 601 locally.

The ten trunk-test relays 623 to 632 are now connected to the IT wires of the ten finder trunks serving the selected switch 200. Assuming the first trunk available to the calling line to be idle, battery potential on its IT wire operates test relay 623, which locks into and opens the chain at its contacts 1 and 2. It remains operated until the battery is removed from its IT wire, and holds relay 622 locked. Contacts 5 and 4 of 622 and 623 extend ground potential over hold-magnet wire HM1, which is extended through make contacts 36 of operated call-in relay 650, to operate the hold magnet H1 associated with the selected trunk. The connection is thereby closed from the calling line to the selected trunk, and the cutoff relay in the calling line circuit is operated as described. Ground is thereby removed from the tens and units wires T0 and U00, permitting the operated units relay U0 to restore. Group relay 601, however is held locked operated from contacts 2 of 622. Thus, the operated select magnet U of 200 is held operated to hold call-in relay 701 until an idle register is brought in to take over the holding of the connection.

As described with reference to Figs. 2 and 3, when an access switch 350 connects up an idle register such as R1, the battery potential on the idle test conductor IT of the finder trunk is removed, thereby open-circuiting slow-restoring test relay 623. Restoration of test relay 623, after the seized register has replaced holding ground, restores all operated relays of the line controller.

For connector action, when line controller 600 is seized over conductor group 621, as by relay CH of connector C1 (Fig. 5), ground appears on the start lead ST of group 221, operating start relay 643 to ground wire 691 and to operate connect relay 644 of tens register TR.

When ready to send the tens digit, the calling register (such as R1) places battery potential on conductor R of 221, operating relay 637, which operates relay 636. Ground potential from rectifier 662 is thereby extended to conductor T of 221 by way of contacts 3, 4, and 3 of relays 639, 637, and 636. This signals the register that the controller is in readiness to receive the tens-digit signals.

The calling register now clears the conductors T and R of 221, and shortly transmits polarized current signals in a 4-element code over these conductors. Relay 637 is released by the conductor clearing. It connects T and R of 621 to the receiving relays 639 to 642 to receive the forthcoming digit signals, relay 636 remaining locked to 671. Relays 639 to 642 are rectifier poled by rectifiers 657 to 660 respectively.

Assuming the tens digit to be the digit 7, the register sends a negative and a positive pulse (respective half-cycles of rectified 60-cycle current) over T of 221 to operate relays 641 and 642 in succession, sending no signals over R of 221 for this digit value. For other digit values other combinations (at least one, but no more than two) of relays 639 and 642 are operated according to an arbitrary code which is evident from the 10-output contact tree of storage relays A to D of register TR.

In the assumed example, relays C and D of TR are operated by relays 641 and 642 to select digit wire 7 of group 663. Each such relay locks to ground on wire 691, by way of transfer 645, which remains short-circuited until all relays 639 to 642 come to rest in a restored condition at the end of the digit transmission, whereupon 645 operates and prepares to extend starting ground to register UR, at the same time ungrounding conductor 671 to restore relay 636. 637 is thereby reconnected to R of 221, but cannot reoperate 636 until ground reappears on 671.

When 644 restores responsive to the operation of 643, it disconnects storage relays A to D of TR at its contacts 3 to 6. At its contacts 2, it extends operating ground to the corresponding relay 646 of units register UR, which places register UR in receiving condition. Ready ground is reapplied to conductor 671 through contacts 1 of 647 and 646. Subject to the reoperation of register-ready relay 637 over R of 221 (when the register is ready to send the units-digit signals over T and R of 221), relay 636 reoperates over (and locks to) conductor 671, again restoring 637 to send the receiver-ready signal to the register from ground through rectifier 662. The register thereupon again clears T and R of 221, restoring relay 637, and sends thereover the signals indicative of the units digit.

The units-digit signals operate one or two receiving relays 639 to 642 to operate the corresponding storage relays A to D (not shown) of UR to select the corresponding units conductor 0 to 9 of group 644.

Transfer relay 647 operates on the cessation of the units-digit signals, with results as described for relay 645. That is, relays 636 and 637 are recycled; 646 restores; and 648 of stations register SR operates to prepare SR to store the stations-digit information received by 639 to 642. One of the stations conductors 1 to 4 in group 221 is selected by SR according to the received stations-digit information.

When the stations-digit information has been received, transfer relay 649 operates, restoring relay 636 and 648, and operating test-signal relay 638 when 648 restores.

Shortly following the transmission of the stations-digit signals, the register again places battery potential on conductor R of 221 to operate relay 637, which operates 638. With 636 to 638 operated, the controller is ready to transmit a signal to the register from test relay 634 or 635, depending on whether the called line is busy or is idle, as will be later described.

Upon the noted operation of transfer relay 647 at the end of the receipt of the units digit, make contacts 2 thereof extend ground potential to one terminal of connector-group relay 611 in the finder-action chain of relays 601 to 610. If that chain is idle, or when it next becomes idle, relay 611 operates. It locks into the chain and opens it at its contacts 4 and 5.

Contacts 3 and 2 of 611 extend ground to the input of contact trees of TR and UR to ground the selected one of the digit conductors 0 to 9 in tens and units conductor groups 633 and 644. A select-magnet operation occurs in one of the switches 200 according to the tens conductor 613 selected, and now grounded, thus operating a call-in relay such as 701. The units digit information (a ground on one of the units conductors 664) causes a principal select magnet to operate in the selected switch 200, through contacts of 701. Relay 622 thereupon operates over ON2 and grounds conductor H of 221, common to all connectors C1 to C15. This ground is returned over the one of conductors H11 to H25 of 221 which corresponds to the calling connector, and traverses a contact of call-in relay 701 and a conductor H11 to H25 in group 220 to operate the corresponding hold magnet of the concerned switch 200. That hold magnet connects the forward conductors of the connector to the selected called line, causing ground to be placed on conductor L of group 221, and connecting the sleeve conductor S of the called line to conductor S of 221 for the busy-idle test of the called line.

If the called line is busy, ground on S of 221 prevents operation of idle relay 635. A short time later, slow-operating busy relay 634 operates through contacts of relays 633 and 635. Solid ground is thereby placed on conductor R of 221 through contacts 2 of relays 636 to 638 to signal the register that the called line is busy.

If the called line is idle, relay 635 operates through contacts 2 of 635, and over S of 221, in series with the cutoff relay of the called line, which latter relay also now operates. At contacts 3 of 635 and 638, and contacts 4 and 3 of 637 and 636, a rectifier connection, poled oppositely to 662, is made to T of 221 to signal the idle-line condition to the calling register, such as R1. At its contacts 2, idle relay 635 disconnects busy relay 634 and grounds conductor 683 of SR, thereby grounding the selected one of stations wires 1 to 4 in group 221 conditioning the calling connector to ring the called one of the stations on the called line.

When the calling connector ungrounds start conductor ST in group 221, start relay 643 restores, clearing out line controller 600.

*Figures 8 and 9*

The apparatus of Figs. 8 and 9 is usable alternatively (1) at the first-selector stage of Figs. 1 and 2 to 5, as the controller 800F and call-in relays 900F, and (2) at the second-selector stage as corresponding items 800S and 900S.

When used at the first-selector stage the equipments of Figs. 8 and 9 terminates the conductors in groups 307 and 312, and are referred to as 800F and 900F. Seizure of 800F occurs over conductor group 307 for either outgoing or locally terminated calls.

When seizure of 800F occurs for locally terminated calls, conductors E and 1 to 10 in group 307 are unused, and a register-ready battery potential is projected forward from the register on the R conductor to operate the RQ relay which locks through its contacts 3. Contacts on the RQ relay operate the H relay; open the tip and ring conductors from the code-receiving relays RR1, RR2, TR1, and TR2; and prepares to send a controller-ready signal.

Relay H locks to start wire ST, grounded in the calling register. At its make contacts 6, it places a polarized ground potential on the tip conductor T from rectifier 831 to signal the calling register that it is ready to receive the signals indicative of the thousands digit. When the register receives this controller-ready signal, it clears T and R of 307, releasing RQ, and shortly transmits coded signals over T and R indicative of the thousands digit.

On the noted seizure of 800F ground appears on wire A or wire B of group 304, depending on which switch section contains the calling selector, to operate either relay A or relay B in preparation for testing the concerned group of trunks to be called-in when the controller receives the digit information. The selector-switch arrangement and the level (or trunk-group) assignment is substantially as shown in the noted Patent No. 2,768,241.

Responsive to the receipt of the coded signals transmitted over T and R of 307 as described with respect to line controller 1600, at least one, and not more than two, of the receiving relays RR1, RR2, TR1, and TR2 is operated, depending on the value of the digit.

Ground at make contacts 2 of relay H is extended through the make contacts of any operated one of the receiving relays to operate the corresponding ones of the recording relays A to D, which lock operated in series with the ED relay, which operates following the cessation of coded signals from the register. Ground from contacts 2 of relay H is extended through contacts of the operated recording relays A to D to wire 851, and thence through 1 of H to operate relay CONN.

Relay ED disconnects T and R of 307 and extends the ground on wire 851 to the contact pyramid of the operated recording relays A to D to operate the selected one of the group relays G1 to G10. Contacts on the operated relays G1 to G10 call-in the twenty idle-test wires in the called trunk group, the first ten or second ten of which are connected to test relays T1 to T10 depending on whether relay A or relay B is operated. The operated relay G1 to G10 operates one of the C1 to C5 relays which corresponds to the switch serving the trunks containing the called level. Contacts 4 of CONN close a timing circuit for the slow-operating busy relay BY. If all trunks in the selected group are busy, no relay T operates. Relay BY then operates and grounds conductor T of 307 to signal an all-trunks-busy condition, following which 800F is released.

Responsive to the stated connection of the selected IT wires, the relay T1 to T10 associated with the lowest-numbered idle trunk is operated over its IT wire in group 312 and is held operated to the exclusion of all other T relays. Contacts on the operated T relay extend ground from relay CONN, through contacts on the operated C relay, to the select magnet wire corresponding to the location of the selected trunk. At the same time, contacts of the operated test relay and group relay extend ground through the operated C relay to wire U or L to operate the upper or lower select magnet which corresponds to the particular trunk selected.

By the operation of the upper or lower select magnet and the chosen one of the principal select magnets 1 to 10, ground appears on the off-normal wire ON of the switch, and is extended through contacts of relay CONN to H of 307, from whence it is extended through the register-access switch to operate the hold magnet associated with the calling selector. A short time later, the register ungrounds ST of 307 permiting H relay to restore, releasing all operated relays of Figs. 8 and 9.

When seizure of 800F occurs for an outgoing call, ground from the calling register is transmitted over E of 307 to operate relay CONN immediately, and a ground indicative of the desired outgoing level appears on one of the wires 1 to 10 of group 307, and is extended by way of contacts of relay CONN to the corresponding relay G1 to G10, with results as described.

When used at the second-selector stage, the equipments of Figs. 8 and 9 terminate the conductors in groups 402 and 412, and are referred to as 800S and 900S.

When seizure of 800S occurs, over conductors 402 by a calling hundreds selector SS1 to SS24, the operation is substantially as described for 800F in handling a locally-terminated call, except that grounding of start wire ST of 307 operates relay SH, which at its break contacts opens the test battery wires of all selectors in the group to prevent seizure of another one until 800S is cleared out.

Figure 10:
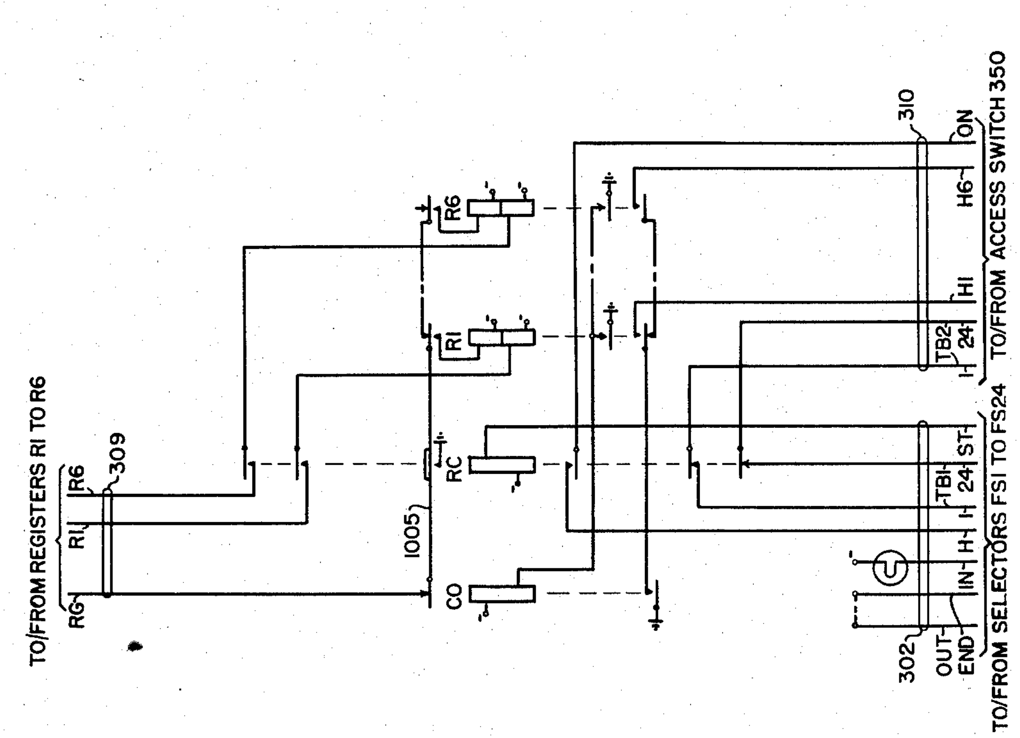
Fig. 10 shows the register allotter 1000 of Figs. 1 and 3.

*Figure 10*

Figure 3:
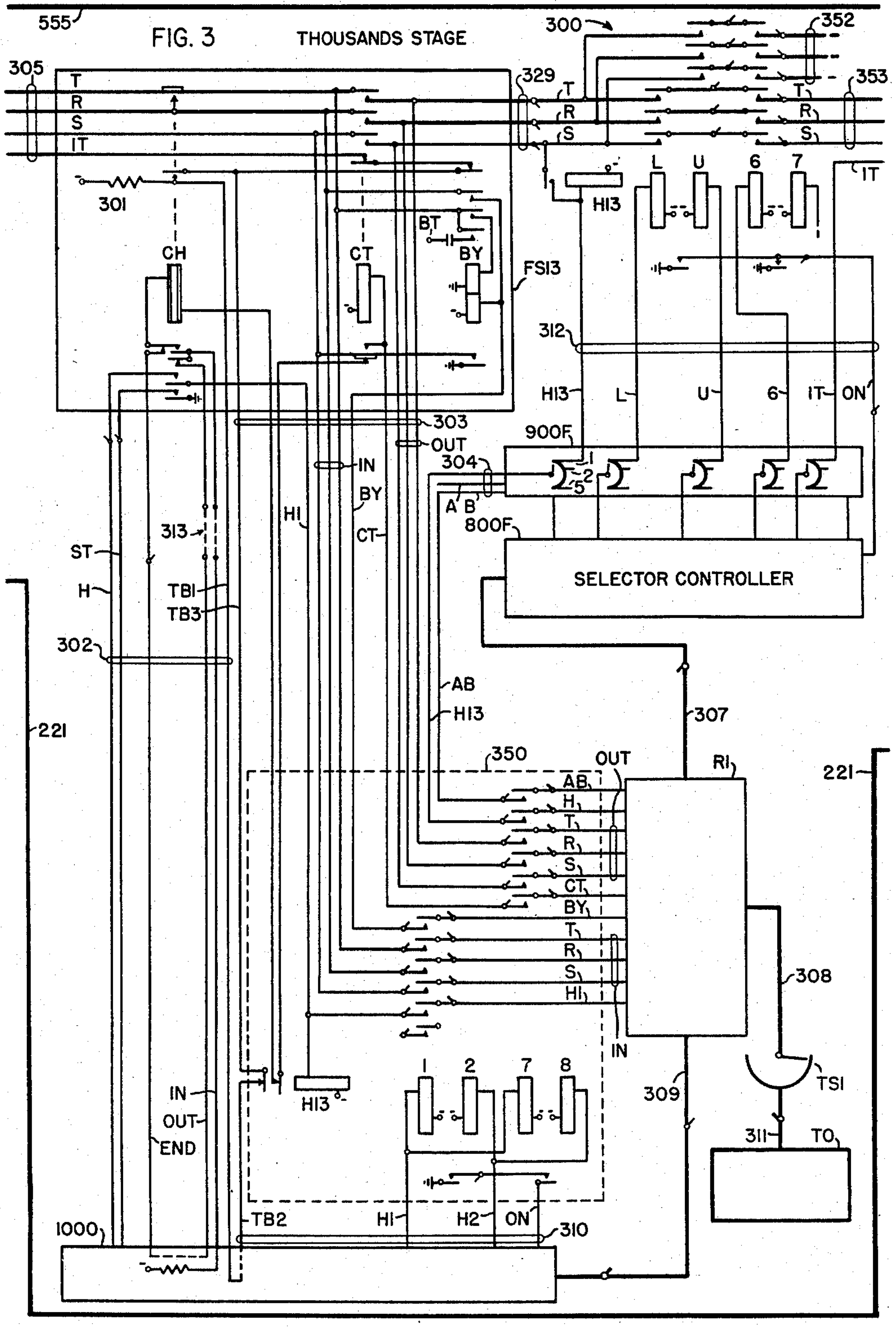

Referring to Fig. 10, the register allotter 1000 of Figs. 1 and 3 terminates conductor groups 302, 309, and 310, associated respectively with selectors such as FS13, register-access switch 350, and the registers R1 to R6.

Allotter 1000 is seized from selectors FS1 to FS24, which grounds the start wire ST of 302 to operate call-in relay RC. Break contacts on relay RC open the test-battery conductors TB1 from TB2 in each of the associated selectors, temporarily marking all idle ones thereof artificially busy.

Relay RC grounds wire 1005, thereby grounding RG of 309, which is connected to the register-test wires R1 to R6 of 309 of respective idle registers, thereby operating the corresponding ones of the register test relays R1 to R6. The lowest-numbered R relay which operates locks to the grounded wire 1005. Relay CO operates to terminate the test. It grounds the selected one of the wires H1 to H6 of 310 extending to the select magnets of access switch 350, causing selection therein of the allotted register. Contacts of the operated select magnets ground wire ON of 310, which is now connected through make contacts on relay RC to wire H of 302. This ground operates the hold magnet of switch 300 of the vertical serving the calling selector.

The calling selector (such as FS13) shortly removes ground from ST of group 302, restoring all operated relays of Fig. 10.

*Figure 11*

Register R1 of Figs. 1 and 3 is shown in detail in Fig. 11. It includes a repeatedly operable digit register DR for receiving each of the dialed digits of a called telephone number, and a group of five storage registers SR1 to SR5 for storing the respective dialed digits for later transfer to a translator, and resettable by the translator to store the digits of the translated number for transmission by sending relays SA to SE.

Upon seizure of register R1 over conductor group 306 by access switch 350, the T and R conductors of IN are looped, resulting in the operation of relays L, RL, RLA. Relay RLA grounds conductor S of IN to maintain the preceding connection intact; grounds H1 of 306 to maintain the hold magnet of access switch 350 operated and to operate relays TM1 and TM2; separates RG and R1 of group 309 to mark register R1 busy in allotter 1000; and connects dial-tone lead DT to T of IN to return a dial-tone signal to the calling line.

In response to the dial-tone signal, the calling subscriber dials the digits of the desired number, which comprises office, thousands, hundreds, tens, and units digits for a locally terminated call. For each dialed digit, the loop across T and R of the IN set of group 306 is interrupted to cause a series of momentary restorations of line relay L of register R. A series of stepping pulses is thereby delivered to STEP magnet of DR, to step brushes BR1 and BR2 upon the contact set corresponding to the value of the digit dialed. Slow-restoring relays S and SH respond to the first pulse of the series, and restore in succession at the end thereof. With relay S restored and relay SH operated, ground potential is extended to the brushes of register DR to energize a 2-out-of-5 code combination of the five conductors A to E according to the value of the dialed digit. For the first (office) digit, the corresponding two of relays A to E of storage register SR1 are thereby operated and lock through SQ1 to ground on conductor 1155, connected to 1105, grounded by RLA.

When SH restores, it ungrounds the brushes of DR, permitting SQ1 to operate in the locking circuit of A to E of SR1, and it energizes magnet RLSE of DR, which restores the brushes to normal. Contacts ON open-circuit RLSE.

The operation next occurring depends on the value of the office digit recorded in SR1.

As shown at jumper blocks 1149 and 1150, office-digit values 1 to 4 are unassigned. The corresponding terminals of 1149 are jumpered to busy terminal BY of 1150, connected to relay BY. Thus, if the digit value recorded is 1 to 4, ground on input wire 1148 (via contacts of relays OMA and TS) passes through contacts of the operated pair of relays A to E of SR1 to operate relay BY. Relays BU and CO are thereby operated to ground wire BY of group 306, which causes the first selector, such as FS13, to operate its busy relay BY as described. Relay CO opens wires T and R of IN to clear out the register.

As shown at 1149 and 1150, office-digit values 6 to 0 are assigned to respective outgoing groups of trunks, by jumpers extending to desired ones of level wires L1 to L10. Ground on any such wire (when the office digit value is 6 to 0) is extended through a rectifier to one terminal of outgoing-chain relay CH–2. If the chain represented by conductors IN, OUT, and END of group 307 is idle, or as soon as it becomes idle, relay CH–2 operates therein; locks itself into (and opens) the chain; extends terminals L1 to L10 of 1150 to wires 1 to 10 of 307 for group marking; and grounds conductor E of 307 to cause immediate outgoing action of 800F to occur during the inter-digit interval. Relay CH–2 also joins H of 306 to H of 307 for the hold-magnet operation hereinbefore described, and connects the lower winding of relay CO to these joined conductors, to operate CO coincidental with the hold-magnet operation to initiate clearing out of register R1. CO also ungrounds conductor 1148 to permit CH–2 to restore promptly, to thus free the associated selector-controller chain for use by the other registers.

As illustrated, terminal 5 of block 1149 is unjumpered since value 5 of the office digit is assigned to the local office. Therefore, if SR1 records the office digit 5, neither relay BY nor CH–2 is operated, and the register R1 awaits the dialing of the thousands, hundreds, tens, and units digits.

On the dialing of each succeeding digit, register DR is set and restored, as described, to place corresponding markings successively on the associated code conductors A to E, which markings are stored in registers SR2 to SR5 respectively, each being similar to SR1. As described for relay SQ1, relays SQ2 to SQ5 operate respectively at the end of the second to fifth settings of DR1 to switch their common setting conductors 1198 sequentially.

When it operates, after the final digit has been stored in SR5, relay SQ5 opens setting conductors 1198 and extends ground to one terminal of translator-seizing relay TS. If link 308 is individual to register R1, as is indicated in Figs. 1 and 3, battery may be connected directly to the right-hand terminal of relay TS for immediate operation thereof in all cases. However, a substantial saving is made in the number of translator-access switches (such as TS1 of Fig. 12) by making each link 308 common to a number of registers, each in a separate group serving groups of 24 first selectors. This common arrangement is intended to be shown in Fig. 11 by the indicated multipled connections for the conductors of link 308, and by the chaining of the operating circuit of relay TS over conductors IN, OUT, and END of 1199. Thus, relay TS operates only when link 308 is idle, or becomes idle.

By locking into (and opening), chain 1199, relay TS marks link 308 busy by precluding operation of the TS relay in any other register having access to link 308. Relay TS also connects register R1 conductors 1 to 25, HB, RL, RCK, BY, and OK to the corresponding conductors of 308, and it ungrounds conductor 1148 to prevent spurious operation of CH–2 or BY when SR1 is later reset.

The wires 1 to 25 of R1 comprise five 5-wire code sets, each set representing the storage relays A to E of a different one of the registers SR1 to SR5. Two relays in each such set are now locked to ground through the associated SQ relay, as described, wherefore there is a ground potential on a code combination of two in each set of five of the wires 1 to 25.

Figure 12:
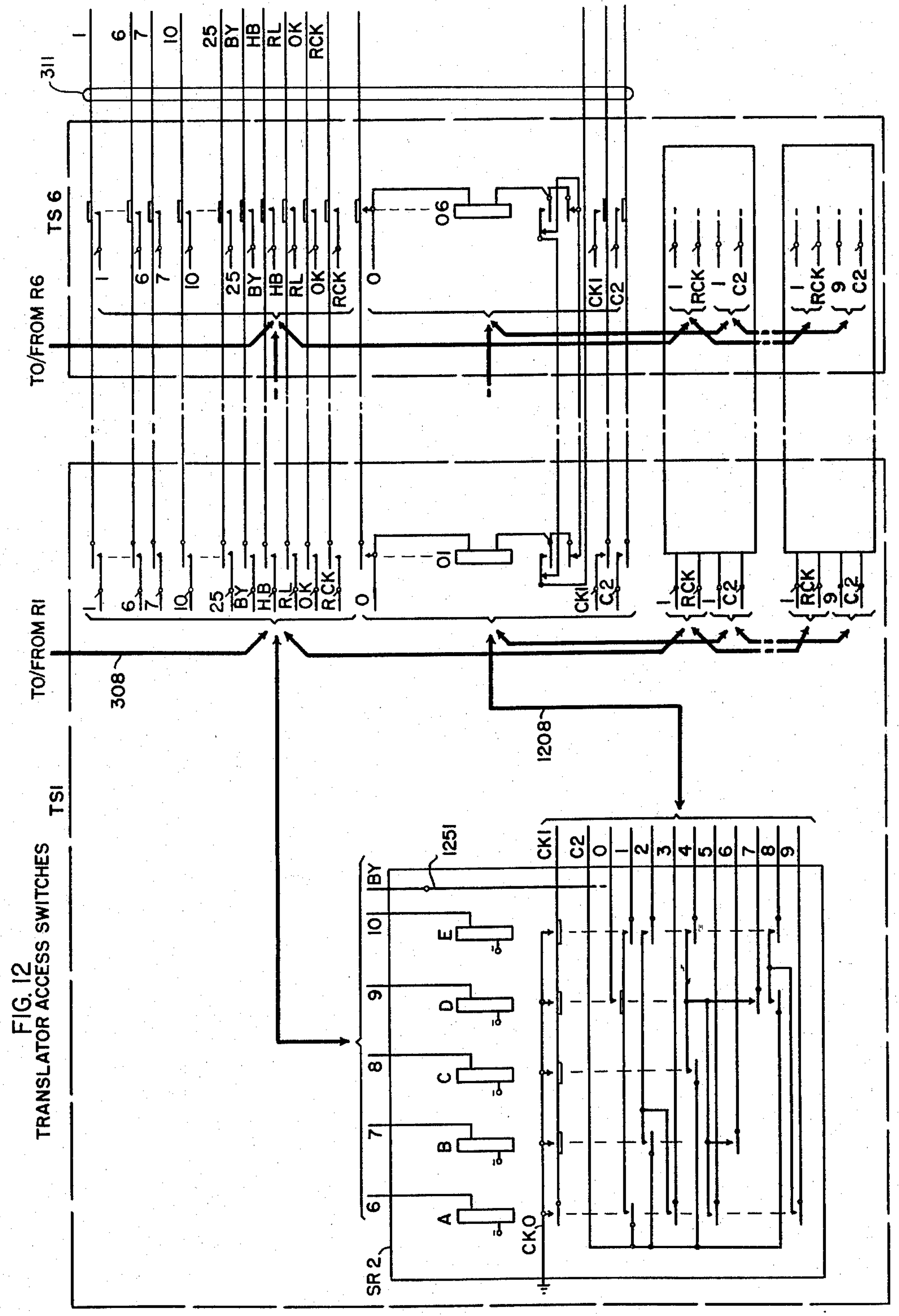
Fig. 12 shows a translator access switch such as TS1 to TS6 of Fig. 1, of which TS1 is indicated in Fig. 3.

The ground appearing on two of the conductors in the second-digit set 6 to 10 of 308 (corresponding to the stored thousands digit) informs the translator-access switch TS1 of Figs. 1, 3, and 12 which translator T0 to T9 to seize.

Upon seizure of the translator, conductors 1 to 25, and others, of link 308 are extended thereto. The hundreds, tens, and units digit information stored on registers SR3, SR4, and SR5 is thereby sent to the seized translator over conductors 11 to 25 of register R1 and link 308.

The seized translator first stores this digit information for translation, and then grounds release conductor RL of link 308, operating relay RL in R1.

Relay RL disconnects each storage register SR1 to SR5 from its associated SQ relay, thereby permitting all storage and SQ relays of SR1 to SR5 to restore.

The translator checks wire RCK of 308 for absence of battery to show that all register storage relays are restored. Thereupon, the translator ungrounds RL of 309 to restore relay R1 for the resetting of storage registers SR1 to SR5 over wires 1 to 25 of 308 in a 2-out-of-5 code according to the translated number corresponding to the called number. Two of the storage relays A to E of each register SR1 to SR5 are thereby operated, and locked to store the thousands, hundreds, tens, units, and stations digits respectively of the translated number.

The translator now grounds wire OK of 308, operating out-mark relay OM, which operates its auxiliary relay OMA. Relay OM restores relay TS to free link 308 and the translator. The consequent disappearance of resetting ground potential from all conductors 1 to 25 of R1 permits relays SQ1 to SQ5 to reoperate in the locking circuits of the storage relays of SR1 to SR5.

Out-mark relay OM also locks operated to wire 1105, and its upper contacts extend ground, through back contacts of ITM, and break contacts 1 of sequence counter SEQ to one winding terminal of local chain relay CH–1, operating it in the event that the associated selector controller 800F is idle, when the chain circuit which includes wires IN, OUT, and END of group 307 is complete. Operation of relay CH–1 results in the individualization of register R1 with the selector controller 800F over conductors in group 307. CH–1 grounds start wire ST of 307 and wire AB of 306; grounds wire W1 of storage register SR1; connects conductors T and R of 307 to the out-sending equipment; and locks operated through contacts of RLA and CK. Selector controller 800F is thereby made ready to receive the translated thousands digit stored at SR1.

The ground on wire W1 of SR1 solidly locks the operated ones of relays A to E of SR1, and short-circuits and restores relay SQ1, thereby connecting the ground on the wire W1 through contacts on the operated ones of the storage relays of SR1, through break contacts of SQ1 to line 1198, and thence through make contacts of relay OMA to the battery-connected windings of sending relays SA to SE operating the ones thereof that correspond to the operated storage relays of SR1.

With relays TM1 and TM2 still operated, battery from the upper winding of marginal relay BU is now extended, through contacts on the operated pair of the send relays SA to SE, to the connected conductor R of 307 to signal controller 800F that the register is ready to transmit. Also, an A.C. potential from transformer TR is extended through the rectifier-polarized relays RY and ID to conductor T of 307 in readiness for receiving a rectifier poled half-wave signal from the selector controller that it is ready to receive the signals indicative of the translated thousands digit.

When the rectified-ground ready signal is placed on conductor T of 307 by selector controller 800F, ready relay RY is operated, operating clearing relay CL which locks to ground on 1105 and clears conductors T and R of 307 for code-signal transmission. Relay CL also open-circuits relay TM1, causing slow relays TM1 and TM2 to restore in timed succession. With TM1 released and relays TM2 and CH–1 operated, negative and/or positive half-cycle pulses of current are transmitted from transformer TR and over one or both of conductors 1181 to one or both conductors T and R of 307, depending upon which of the sending relays SA to SD are operated. For SA and SB, negative and positive pulses respectively pass over conductor R; for SC or SD, negative and positive pulses respectively pass over T. The thousands-digit information thereby reaches 800F over T and R of 302 while slow relay TM2 remains operated.

When relay TM2 restores, it disconnects the sending conductors T and R and operates relay ITM, which locks to ground through contacts of any operated relay SA to SE. Relay CL now restores, and relays TM1 and TM2 reoperate to prepare for the next digit-sending operation. ITM also ungrounds 1180, opening the operate circuit of the now-locked relay CH–1.

ITM also energizes operate winding OP of magnet M of the residual-stick sequence counting device SEQ, advancing this device one step by actuating its contacts 1. Hundreds-digit wire W2 is thereby selected, but remains ungrounded until ITM restores and regrounds 1180.

With SEQ having advanced, but with the thousands-digit setting still held in sending relays SA to SE; with ITM and CH–1 locked operated; relay CL restored; and with TM1 and TM2 reoperated; register R1 awaits disposition of the call by controller 800F.

If 800F finds all trunks in the selected thousands group busy, it grounds R of group 307 to operate busy relay BU with results as described, including the grounding of BY of 306 by BU and CO. CO thereupon releases CH–1 as a part of the register-clearing operation.

If 800F finds an idle trunk in the selected group, H of 307 becomes grounded, extending ground through contacts of CH–1 to H of 306. The resulting switching operations cause ground to appear on S of OUT group in 306, operating check relay CK, which locks to S of IN, thus joining the in and out S conductors for holding purposes.

Relay CK also restores relay chain relay CH–1, which frees controller 800F and removes ground from wire W1, permitting relay SQ1 to reoperate in series with the storage relays of SR1. Sending relays SA to SE are thereby restored, to restore relay ITM, which regrounds conductor 1180. Ground is thereby placed on W2, short-circuiting and restoring relay SQ2, thereby connecting code conductors 1198 to the storage relays A to E (not shown) of SR2, operating a combination of sendings relays SA to SE according to the stored hundreds digit.

A ready signal (battery through the upper winding of relay BU) is again sent over conductor R (now through R of OUT in group 306, since CH–1 is restored) to inform the concerned controller (such as 800S) that the register is awaiting a controller-ready signal. When that signal is received (rectified ground on T of OUT conductors of 306), relay RY operates and operates CL, which locks, releasing relays TM1 and TM2 again in timed sequence to send signals over T and R conductors to the controller in use, now being signals from SA to SE according to the translated hundreds digit.

The transmission of the hundreds digit is followed by similar operations in register R to transmit the tens, units, and stations digits when a line controller, such as 600 of Figs. 1, 2 and 6, is ready to receive any such digits. Sequence counter SEQ is stepped into positions 2, 3, and 4 respectively for the last said digits, and steps into position 5 following the out-ending of the stations digit. Relays SQ3, SQ4, and SQ5 are thereby restored in succession over W3, W4, and W5 to transfer the respective groups of digit signals to relays SA to SE.

When SEQ reaches position 5 and relay ITM again grounds 1180, ground appears on W6 to reoperate SE to again send a ready signal over R of OUT from the batter-connected winding of relay BU.

If the line controllers find the called line busy, solid ground appears on R of OUT in group 306 to operate busy relay BU, with results as described.

If the called line is idle, rectified ground potential appears on the wire T–OUT of a polarity opposing that of the ready signal, thereby operating relay ID, which operates relay CO without BU being operated. Cut-through relay CT is thereby operated to ground CT of group 306 to induce the described cut-through operation at the first selector, such as FS13. Operation of relay CO restores the relays L, RL, RLA, causing all operated relays of register R1 to restore. Relays S and SH are temporarily reoperated on the restoration of L, temporarily closing a circuit for release winding RL of SEQ, demagnetizing the structure thereof, returning SEQ to its illustrated normal condition.

*Figures 12 and 13*

Referring to Fig. 12, six translator access switches may be employed of which the first and the sixth are shown, being TS1 and TS6. They may be individual respectively to registers R1 to R6 (Figs. 1, 3, and 11) or they may also be reached from respective registers of other groups as disclosed in Fig. 11, and described.

Each access switch has up to ten digit selective switch relays, such as 01, associated therewith for connecting its associated calling register to the corresponding translator T0 to T9 (Fig. 13), according to the thousands digit dialed.

When TS1 is seized (from a register such as R1 of Figs. 1, 3, and 11, over the thirty conductors in group 308), seizing battery stands on HB of group 308, and marking ground stand on two conductors of each of the five digit groups comprising conductors 1 to 25 in group 308. The ground on two of the five wires of the thousands-digit set 6 to 10 in 308, operates the corresponding two relays of group A to E of SR2 of Fig. 12. Contacts of these relays extend ground from wire C2 of 1208 to energize the one of the wires 0 to 9 in group 1208 which corresponds to the dialed thousands digit. If the thousands digit dialed is 0, ground is placed on wire 0 of 1208 to seize translator T0.

If translator T0 is idle, or when it becomes idle, relay 01 is operated, through the chained contacts of relays 01 to 06 to battery at 1305. Relay 01 locks operated and holds the contact chain open to the other switch relays (such as 06) associated with T0. Relay 01 also seizes the selected translator T0 of Fig. 13 by extending thereto the conductors of group 308 and CK1 of 1208.

The digit grounds on the remaining sets of digit wires 1–25 in groups 308 and 311 operate the corresponding relays in each of the storage devices S1 and SR3 to SR5 of T0, two relays operating in each. Each such device is similar to SR2 of TS1, Fig. 12. SR1 is set over wires 1 to 6 of 308 and 311 according to the dialed office digit; SR3 is set over conductors 11 to 15 according to the hundreds digit; SR4 over 16 to 20 according to the tens digit; and SR5 over 21 to 25 according to the units digit. Also battery on wire HB of 308 operates relay R which locks relay 01 operated and causes relays RR, OK2, and TM to operate in succession.

With relay OK2 operated as described, ground is placed on wires C3 to C5 of SR3 to SR5, these wires corresponding to wire C2 of SR2 (Fig. 12). Thereby ground is placed on one of the digit wires in each of the digit groups 1311, 1312, and 1313 corresponding to the dialed hundreds, tens, and units digits, thereby operating one of the ten hundreds relays H0 to H9, a tens relay T0 to T9, and a units relay U0 to U9. Each such relay locks operated to ground held on HG by relay R.

Serially-related contacts of the operated ones of relays H0 to U9 ground wire OG operating relay OK1 to signify that the dialed hundreds, tens, and units digits have been decoded and stored for translation.

Relay OK1 locks to ground at contacts of R; removes ground from C2 of 311 and 1208; grounds wire RL of 308 to initiate restoration of the digit storage relays in the calling register; and disconnects battery-supply resistor 1307 from RR, leaving RR operated over RCK of 311 and 308 until all storage relays in the calling register have restored. When this occurs relay RR restores, leaving relay OK2 locked to checking ground through conductors CK0 to CK5 (of registers SR2, SR1, and SR3 to SR5) in series. The storage relays (such as A to E of Fig. 12) of these registers all restore upon the clearing out of the corresponding storage registers of the calling register, such as R1. When this has occurred, and relay RR has restored, relay OK2 restores to unground RL of 311 and 308, preparing the calling register to receive the translated number corresponding to the dialed number. On restoring, relay OK2 open-circuits slow-restoring timing relay TM and places ground on wire MG for the slow-release time of relay TM, during which the translated number is to be sent back to the calling register.

The sending back of the translated number is controlled by out-marking relays 1 to 25 and BY. These relays are sensitive, to require only a small current through the rectifier field of the translator. They are connected in common to a reduced battery voltage at 1310 and 1311.

Hundreds relays H0 to H9 connect the 26 wires of cable 1372 (operate leads of relays 1 to 25 and BY) to one of ten branches H0 to H9, according to the dialed hundreds digit. These branches H0 to H9 correspond respectively to ten columns of rectifier blocks BH0 to BH9. Each such column comprises ten rectifier blocks or assemblages, of which there are 100, comprising 0 of column BH0 to 9 of column BH9. Since all such blocks are similar, only the first block, 0 of BH0, is shown in circuit detail. It comprises 26 verticals (vertical conductors) terminating conductors 1 to 25 and BY of its associated hundreds group. (H0 for the first column.) It further comprises ten horizontals (horizontal conductors) terminating ten of the 100 tens-units wires 00 to 99 provided by the illustrated 100-wire relay tree through contacts of tens relays T0 to T9 and units relays U0 to U9. This block is effective only when the hundreds digit is 0, and represents the ten numbers 000 to 009 of the 1000 numbers served by translator T0. The other blocks in the same column (BH0) represent the remaining nine ten-line groups in the same group of 100 numbers, ending with numbers 090 to 099 for block 9 of BH0.

The 100 conductors in groups 1311 to 1320 are multipled to the corresponding blocks in the remaining hundreds columns.

Referring specifically to block 0 of column BH0, the ten horizontals thereof are provided with a forming battery potential by resistors 1381 and 1382, by way of respective isolating resistors 1370 to 1379 to maintain the rectifiers formed, as through respective high-resistance grounding resistors such as 1390 shown for wire 1 of group H0. The verticals of block 0 of BH0 (and the same is true of the other blocks) are provided with respective isolating rectifiers RA1 to RA26, limiting the likelihood of unwanted inter-block current flow.

In each rectifier block, such as 0 of column BH0, the illustrated verticals and horizontals are insulated from each other except where joined by translating rectifiers, such as R1 to R10. Translating rectifiers R1 to R10 are installed at the ninth horizontal of block 0 of BH0 to effect translation of the call number (50009) represented by this horizontal into a specific translated number. Note that called digits 5 and 0 were employed to reach translator T0, and that subsequent digits 0, 0, and 9 were employed to reach the tenth horizontal of block 0 in column BH0. The translated number represented by rectifiers R1 to R10 is No. 11111, comprising thousands, hundreds, tens, units, and stations digit each with the value 1, all according to the previously assumed 2-out-of-5-code.

Column BH0 of rectifier blocks can become effective only when the called hundreds digit is 0, to thus operate relay H0 to call in conductors H0. Conductor 0, 9 of group 311 can become effective only when the tens and units digits are respectively 0 and 9. Thus, only when the seizure of translator T0 results in the operation of relays H0, T0, and U9 is the 9th horizontal of block 0 of column BH0 effective.

The noted ground on conductor MG, now passes through contacts of T0 and U9 to conductor 09 of group 1311, current through each of the rectificers R1 to R10 and the associated ones of rectifiers RA1 to RA25, corresponding conductors in group H0, contacts of relay H0, and over the associated ten of wires 1 to 25 in group 1372, to operate the corresponding ones of out-marking relays 1 to 25. Each such relay, on operating, places ground on its associated conductor 1 to 25 in groups 311 and 308. Two conducors in each 5-conductor digit group in conductor groups 311 and 308 are thereby grounded. The storage relays of the calling register (such as R1) are thereby set and locked according to the translated number 11111. As a checking procedure, the storage relays SR2 of Fig. 12 and SR1, and SR3 to SR5 of Fig. 13 are set in parallel with the storage relays of the calling register. Thereupon, a checking path from ground is established through these registers over checking conductors CK0 to CK5.

When timing relay TM releases, it ungrounds wire MG to restore the operated ones of the outmarking relays 1 to 25, to remove marking ground from the corresponding conductors in group 311, but locking ground from the calling register holds the storage relays of Figs. 12 and 13 for the time being.

With relays OK2 and TM restored, the noted checking ground on conductor CK5 operates relay OK3, which grounds the OK wire of 311 and 308 to signal the calling register that the translator may be released. The calling register disconnects from conductor 308, releasing all storage relays of SR1 to SR5 of Figs. 12 and 13, and restoring relay R of the translator. With R restored, relay 01 of TS1 restores, along with any operated relays of the translator.

If, for example, the "9" block of 100 numbers of the 1000 numbers served by T0 (Fig. 13) is unassigned, conductors H9 are omitted, along with column BH9 of rectifier blocks. Also, conductor BY at hundreds relay H9 is strapped to conductor MG thereby operating busy relay BY (when MG is grounded as described). Conductor BY in groups 311 and 308 is thereby grounded to operate the BY relay in the calling register, which gives a busy signal and frees the translator.

If the dialed thousands digit is unassigned, no corresponding translator is provided. Wire 1251 of Fig. 12 is jumper-connected to the unassigned one of the thousands wires TH0 to TH9 to ground wire BY in 308, with results as described.

If the individual number dialed is unassigned, a similar busy signalling occurs. For example, if the number ending in 001 is called, translator ground on conductor 01 of group 1311 causes current to flow through rectifiers R11 and RA26 to BY in H0, and thence through contacts of relay H0, to operate relay BY of the translator, with results as described. The relays within enclosure P.B.X are for providing common-number (or P.B.X) service for a group of lines which may be selected as desired from the thousands and hundreds groups on the switchboard. As many common-number groups as desired may be provided, with each having its own relays D1 and DA. Relays T1 to T10 of P.B.X comprise an allotter common to the several sets of D1 and DA relays.

As illustrated, the call number ending in 000 is assigned to relay D1. When that number is called, regular translation fails for the lack of rectifiers connected in block 0 of BH0 to horizontal 00. Instead, the MG ground placed on conductor 00 of 1311 passes through jumper 1364, relay D1 and associated rectifier, jumper 1365, and thence to battery through contacts of H0 and resistor 1315. Relay D1 operates relay DA to effect connection with the windings and contacts of preference-chained allotter relays T1 to T10. One or another of relays T1 to T10 now operates, depending upon the busy or idle condition of the lines of the called group, the sleeve conductors of which are connected respectively to conductors S1 to S10 by switch-room jumpers or cables (not shown).

If relay T10 is the one to operate, from battery on S10 through the CO relay of the concerned line, it grounds jumper 1366 via contacts of DA. As illustrated jumper 1366 is extended to conductor 99 in group 1320, being conductor 99 at rectifier blocks 9 of the ten columns. With hundreds relay H0 operated, the ground on the last said conductor 99 is effective only at block 9 of column BH0, whereat it produces the same translation as occurs when the number called ends in 099.

If no line is idle in the called P.B.X group, none of the relays T1 to T0 operates, wherefore no translation occurs. Time-out apparatus (not shown) may become operative in the translator and/or calling register to cause a busy signal to be returned to the calling line and to clear the register and translator.

While we have described above the principles of our invention in connection with specific apparatus, it is to be clearly understood that this description is made only by way of example and not as a limitation to the scope of our invention.

We claim:

1. In a crossbar switching system serving stations located on lines terminated at cross bar switching apparatus adapted to extend connections from calling stations to respective called stations by way of trunks to which calling lines are extended, a group of number registers common to the trunks, switching means responsive to the seizure of any trunk for associating an idle number register of the group individually with that trunk, the stations being indexed respectively by call numbers which comprise groups of numbers, digit registers in any number register and means for operating them to record the digits in a called number, the recorded digits including at least one digit indexing the number group containing the called number, a group of translators common to the number registers and including translators corresponding respectively to the number groups, means controlled from any number register for seizing a translator corresponding to the called number group, means for transferring the registered number from the number register to the seized translator, means in the seized translator for sending back to the number register a translated equivalent of the transferred number which indexes the location of the line serving the called station, means for thereupon releasing the seized translator and for retaining the number register associated with the seized trunk, means controlled by the number register for operating the crossbar switching apparatus according to the said translated equivalent to extend the connection to the line at the said indexed location, and means for thereupon freezing the number register.

2. In a crossbar switching system according to claim 1, wherein each called number is arranged to have a separately assignable translated number irrespective of those of the other called numbers, and means whereby the calling of one number may cause completion of a call to any idle one of a group of lines selected without regard to their respective switchboard terminations and/or the calling of any one of a group of arbitrarily selected numbers may result in the extension of a connection to the same line.

3. In a crossbar switching system according to claim 1, wherein any translated number may contain an arbitrarily selected station-location digit, and wherein station-signalling apparatus is obedient thereto to permit any desired arbitrary grouping of stations on the same line irrespective of their call numbers.

4. A crossbar switching system according to claim 1, wherein the digits of the called number are registered on respective digit registers in the number register which are reset by the translator to control the completion of the connection.

5. In a crossbar switching system according to claim 1, wherein any digit is recorded on a group of relays fewer than the number of digit values, with means for operating the relays in respective combinations according to digit value.

6. In a crossbar switching system according to claim 1, wherein any of the said translators includes digit-recording apparatus and a relay tree controlled thereby to select a marking conductor according to a combination of recorded digits, and means controlled over the selected conductor for transmitting the translated equivalent of the called number.

7. In a crossbar switching system according to claim 6, wherein the said means controlled over the selected conductor includes an associated portion of a rectifier matrix.

8. In a crossbar switching system according to claim 7, wherein the said portion of the rectifier matrix is variable at will to permit alteration of any translated number.

9. In a crossbar switching system according to claim 6, wherein there is a further group of marking conductors selected by a further recorded portion of the number, and rectifier controlled means is provided to render the translated number dependent upon the selected combination of conductors in the two groups.

10. In a switching system serving lines terminated at switching apparatus comprising a series of switching stages through which connections from calling lines to respective called lines each progresses by the seizure in succession of idle interstage trunks each of which is one trunk of a numerical group of trunks, each stage succeeding the first including a controller common to a number of the trunks incoming to the stage, a group of registers common to the trunks of the first group, means responsive to the seizure of any first-group trunk for connecting an idle register therewith, means in any connected register controlled from the calling line for registering the digits of a number indexing the switchboard location of a called line, means responsive to the said registration for seizing the controller at the second stage for use with the seized first-group trunk and connected register, means responsive to the seizure of a trunk incoming to any stage succeeding the second for seizing the controller at the associated stage for use with the seized trunk and with the connected register, means in any seized controller for sending a ready signal to the connected register, means in the connected register responsive to the ready signals for transmitting groups of digit signals to the respective sending controllers in a code containing fewer elements than there are digit values, the signal groups each representing the value of a separate registered digit, each controller including means for recording the coded digit information transmitted thereto and for controlling the switching apparatus at its stage in accordance therewith in furtherance of the said progress of the connection.

11. A switching system according to claim 10, wherein the said connection between a connected register and any seized controller includes a pair of conductors, with the said code elements divided between them, and means for transmitting code-element signals over the two conductors at the same time, thereby further reducing the time required to transmit digit information.

12. A switching system according to claim 11, wherein the said ready signal is transmitted over one of the conductors of the said pair, means in the said register responsive to any ready signal for clearing the conductors of the said pair in the register for code-signal transmission a short interval before such transmission starts, and means in the controller which sent the said ready signal for clearing the conductors of the said pair thereat responsive to the said clearing of these conductors in the said register.

13. A switching system according to claim 11, wherein the said coded signals comprise rectifier-controlled A.C. pulses which are transmitted over the said conductors in combinations corresponding respectively to digit values.

14. A switching system according to claim 11, wherein any said controller includes means for transmitting a busy signal, and the controller at the last stage further includes means for transmitting a called-line-idle signal over one of the conductors of the said pair instead of a said ready signal, and means in the said register for responding selectively to these signals.

15. A switching system according to claim 10, wherein the controller of at least one stage requires a succession of groups of coded digit signals in order to operate the switching apparatus at its stage, and means in any last said controller for transmitting a ready signal for each required group of signals.

References Cited in the file of this patent

UNITED STATES PATENTS

| | | |
|---|---|---|
| 2,585,904 | Busch | Feb. 19, 1952 |